United States Patent [19]
Ide et al.

[11] Patent Number: 5,903,412
[45] Date of Patent: May 11, 1999

[54] RECORDING AND/OR REPRODUCING APPARATUS WITH SWITCHING UNIT FOR SWITCHING A RUNNING STATE OF A MAGNETIC TAPE

[75] Inventors: Eiji Ide; Shuji Koseki, both of Tokyo, Japan

[73] Assignee: Sony Corporation, Tokyo, Japan

[21] Appl. No.: 08/957,939

[22] Filed: Oct. 27, 1997

[30] Foreign Application Priority Data

Nov. 1, 1996 [JP] Japan ..................................... 8-292153
Nov. 5, 1996 [JP] Japan ..................................... 8-293033

[51] Int. Cl.[6] ............................. G11B 15/18; G11B 5/008
[52] U.S. Cl. ............................................................ 360/96.3
[58] Field of Search ................................. 360/85, 93, 95, 360/96.1, 96.3, 137

[56] References Cited

U.S. PATENT DOCUMENTS

| | | | |
|---|---|---|---|
| 3,899,795 | 8/1975 | Watanabe | 360/137 |
| 4,660,109 | 4/1987 | Aldenhoven | 360/96.3 |
| 5,144,507 | 9/1992 | Kurita | 360/96.2 |
| 5,260,844 | 11/1993 | Koga et al. | 360/96.3 |
| 5,307,221 | 4/1994 | Mikawa et al. | 360/96.3 |
| 5,452,160 | 9/1995 | Sakuma et al. | 360/105 |
| 5,621,587 | 4/1997 | Shimizu | 360/96.3 |
| 5,638,232 | 6/1997 | Komoriya et al. | 360/85 |
| 5,654,845 | 8/1997 | Ohtsuki | 360/96.5 |
| 5,729,402 | 3/1998 | Chiou et al. | 360/96.1 |

*Primary Examiner*—Jefferson Evans
*Attorney, Agent, or Firm*—Jay H. Maioli

[57] ABSTRACT

A recording and/or reproducing apparatus employing a tape cassette having a magnetic tape wound about a pair of tape reels includes a supply side reel block, a takeup side reel block, a capstan arbor, a driving unit and a switching unit. The supply side reel block rotationally drives a supply side tape reel and includes a supply side reel block gear portion. The takeup side reel block rotationally drives a takeup side tape reel and includes a takeup side reel block gear portion. A capstan arbor runs the magnetic tape. The driving unit selectively runs the supply side reel block gear portion and the takeup side reel block gear portion in rotation by engaging the gear portions with each other. The driving unit includes a driving source and an intermediate gear for transmitting the driving power from the driving source to the supply side reel block gear portion, takeup side reel block gear portion and to the capstan arbor. The switching unit switches an running state of the magnetic tape by the actuating member being thrust from its initial position. The actuating member is thrust for moving the intermediate gear along its axis of rotation for transmitting the driving power from the driving source to one of the supply side reel block gear portion and the takeup side reel block gear portion and to the capstan arbor.

34 Claims, 17 Drawing Sheets

RECORDING AND/OR REPRODUCING APPARATUS WITH SWITCHING UNIT FOR SWITCHING A RUNNING STATE OF A MAGNETIC TAPE

BACKGROUND OF THE INVENTION

FIELD OF THE INVENTION

This invention relates to a recording and/or reproducing apparatus for a magnetic tape. More particularly, it relates to a recording and/or reproducing apparatus for a magnetic tape having a unit for switching the running state of a magnetic tape.

Heretofore, a tape cassette has a main body portion of a cassette which is made up of an upper half and a lower half and a pair of tape reels, namely a supply tape reel and a take-up tape reel, each carrying a magnetic tape and rotatably housed in the cassette main body portion.

A conventional tape recorder includes a reel driving unit for rotatably driving tape reels of the tape cassette, a playback unit for reproducing information signals from the magnetic tape of the tape cassette, a recording unit for recording information signals on the magnetic tape, a fast feed unit for fast feed of the magnetic tape, a rewind unit for rewinding the magnetic tape, a stop unit for stopping the operations of the playback, recording, fast feed and rewind units and a pause unit for transiently canceling the operations of the playback and recording units.

The playback, recording, fast feed and rewind units of the tape recorder include a playback operating lever, a recording operating lever, a fast feed lever and a rewind lever which, on being thrust, transiently cancels the operations of the playback unit and the recording unit.

The above-described tape recorder has an automatic stop unit for automatically canceling the operation of the respective units on termination of magnetic tape takeup by the rewind side tape reel.

For interlocked actuation of the thrust operating levers and the reel driving units, the tape recorder has a link mechanism and gears on the respective levers for switching between transmission of the driving power during playback, during the fast feed and during the rewind, respectively.

Since the tape recorder has the link mechanism and the gears provided on the operating levers, the mechanism for interlocking the operating levers and the reel driving units is complex and requires spacing while the reel driving unit is poor in operational reliability.

The automatic stop mechanism of the tape recorder effects automatic stop operation by the gears and the link mechanism interlocked with the reel driving mechanism, so that the automatic stop unit is complex in overall structure and requires spacing for mounting. As a result the tape recorder cannot be reduced in size with ease.

The pause unit of the tape recorder has a transmission canceling mechanism for transiently canceling the transmission of the rotational driving power between the gears of the reel driving mechanism designed to run the takeup side reel in rotation. The transmission canceling mechanism is complex in overall structure and requires spacing for mounting. As a result that the tape recorder again cannot be reduced in size with ease.

With the above-described tape recorder, the capstan arbor and the chassis are electrically connected to each other for grounding to remove static charges accumulated on the capstan designed to run the magnetic tape in rotation.

The bearing carrying the capstan arbor is formed of, for example, a metallic material, such that the operation of directly assembling the bearing on the chassis formed of a metallic material is low in efficiency.

The tape recorder employs a grounding structure of interconnecting the chassis and the bearing via an electrically conductive member. This grounding structure, however, has a problem that it tends to be complex in structure.

SUMMARY OF THE INVENTION

It is therefore an object of the present invention to provide a magnetic tape recording and/or reproducing apparatus which resolves the above-mentioned problems.

A recording and/or reproducing apparatus employing a tape cassette having a magnetic tape wound about a pair of tape reels includes a supply side reel block, a takeup side reel block, a capstan arbor, a driving unit and a switching unit. The supply side reel block engages with a supply side one of paired tape reels. The supply side reel block rotationally drives the supply side tape reel and includes a supply side reel block gear portion. The takeup side reel block engages with the takeup side tape reel. The takeup side reel block rotationally drives the takeup side tape reel and includes a takeup side reel block gear portion. A capstan arbor runs the magnetic tape. The driving unit selectively runs the supply side reel block gear portion and the takeup side reel block gear portion in rotation by engaging the gear portions with each other. The driving unit includes a driving source and an intermediate gear for transmitting the driving power from the driving source to the supply side reel block gear portion, takeup side reel block gear portion and to the capstan arbor. The intermediate gear is arranged for movement along its axis of rotation. The switching unit, adapted for switching the running state of the magnetic tape, has at least an actuating member. The switching unit switches the running state of the magnetic tape by the actuating member being thrust from its initial position. The actuating member is thrust to move the intermediate gear along its axis of rotation to transmit the driving power from the driving source to one of the supply side reel block gear portion and the takeup side reel block gear portion and to the capstan arbor.

DESCRIPTION OF THE PREFERRED EMBODIMENTS

Figure 1:
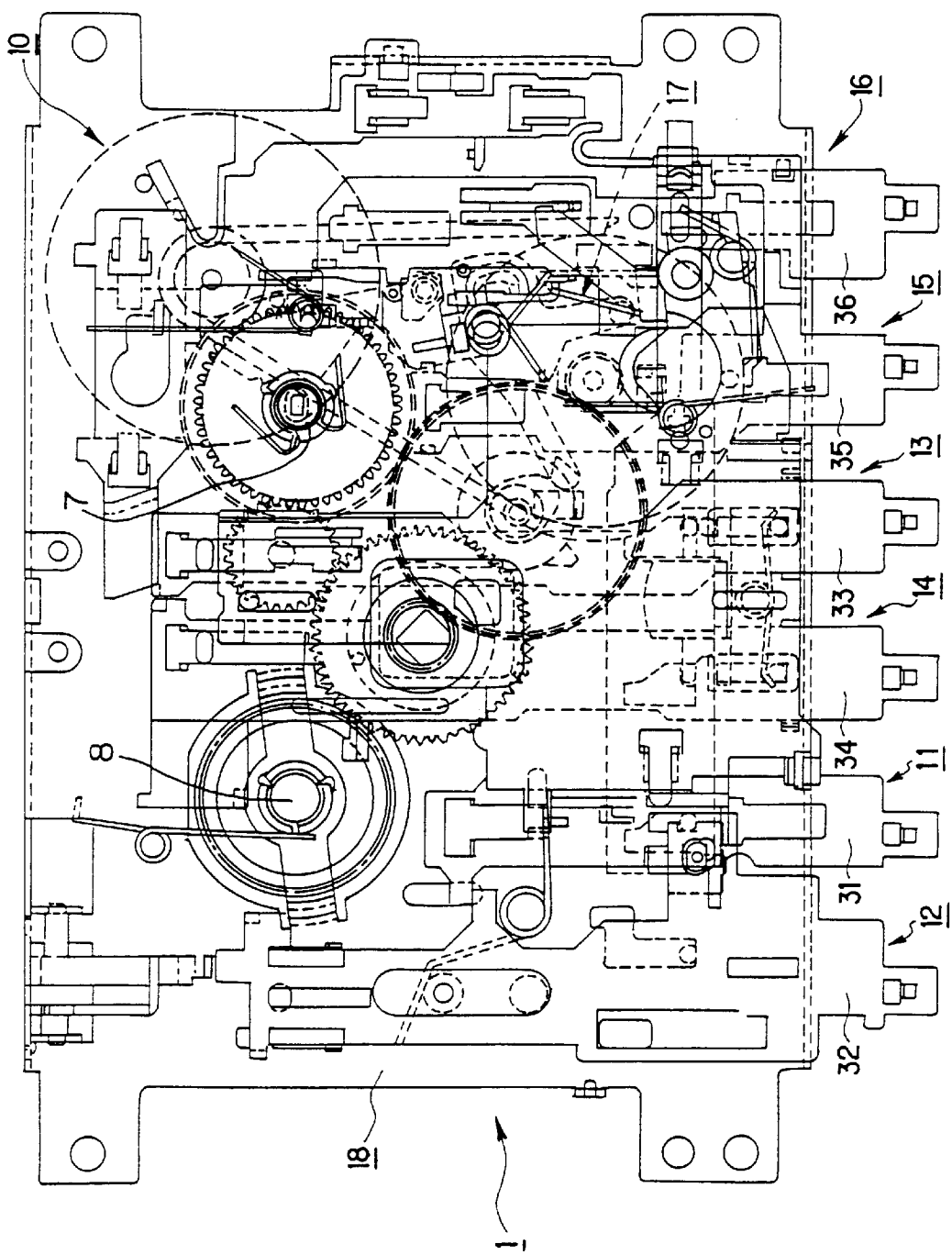
FIG. 1 is a plan view showing an overall structure of a tape recorder embodying the present invention.

Referring to the drawings, a magnetic tape recording and/or reproducing device according to the present invention is explained in detail. The following description is made of a tape recorder configured for recording or reproducing information signals, such as audio signals, on a magnetic tape of a tape cassette having a pair of tape reels carrying a magnetic tape.

Although not shown, the tape cassette used in the tape recorder 1 may be a so-called compact cassette comprised of a cassette main body portion made up of upper and lower cassette halves assembled to each other for rotatably housing a pair of tape reels, namely a take-up tape reel and a supply tape reel, carrying together a magnetic tape thereon.

The tape recorder 1 is now explained in the sequence of:
[1] Structure of the Overall device
[2] Structure of the Reel Driving Unit
[3] Structure of the Reproducing Unit
[4] Structure of the Recording Unit
[5] Structure of the Fast Feed Unit
[6] Structure of the Rewind Unit
[7] Structure of the Stop Unit
[8] Structure of the Pause Unit
[9] Structure of the Automatic Stop Unit;
[10] Operation of the Reel Driving Unit;
[11] Operation of the Reproducing Unit;
[12] Operation of the Recording Unit;
[13] Operation of the Fast Feed Unit;
[14] Operation of the Rewind Unit;
[15] Operation of the Stop Unit;
[16] Operation of the Pause Unit; and
[17] Operation of the Automatic Stop Unit.
[1] Structure of the Overall device Referring to FIG. 1, a tape recorder 1 includes a reel driving unit 10 for rotationally driving a takeup side tape reel and a supply side tape reel of a tape cassette, not shown, and a reproducing unit 11 for reproducing information signals from the magnetic tape of the tape cassette. The tape recorder 1 also includes a recording unit 12 for recording information signals on the magnetic tape and a fast feed unit 13 for effecting fast feed of the magnetic tape. The tape recorder 1 also includes a rewind unit 14 for rewinding the magnetic tape and a stop unit 15 for canceling the operations of the reproducing unit 11, recording unit 12, fast feed unit 13 and the rewind unit 14. The tape recorder 1 also includes a pause unit 16 for transiently releasing the operations of the reproducing unit 11 and the recording unit 12. The tape recorder 1 also includes an automatic stop unit 17 for automatically canceling the operation of the reproducing unit 11, recording unit 12, fast feed unit 13 and the rewind unit 14. The tape recorder 1 further includes a chassis 18 on which are mounted the units 11 to 17.

[2] Structure of the Reel Driving Unit

Figure 2:
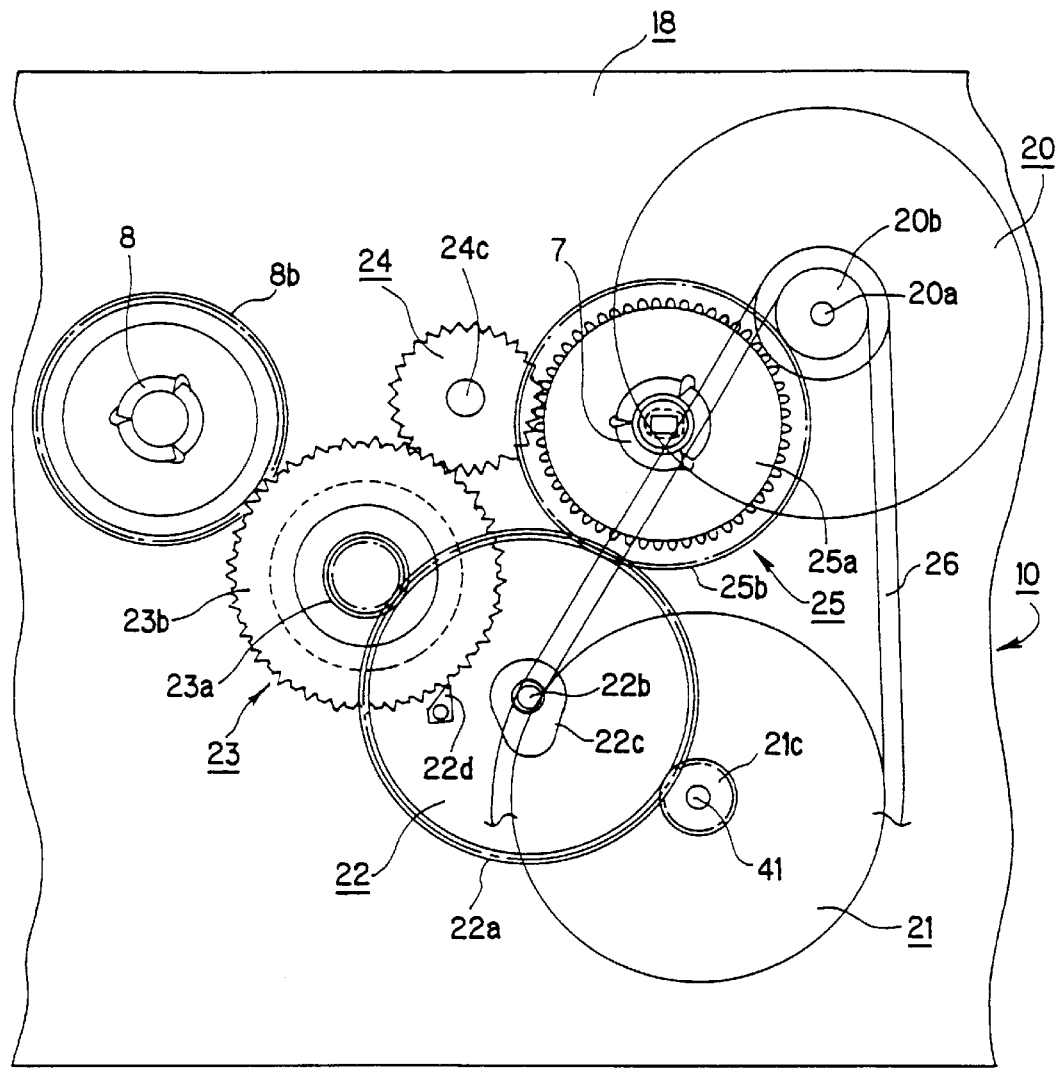
FIG. 2 is a plan view showing a reel driving unit of the tape recorder shown in FIG. 1.
Figure 3:
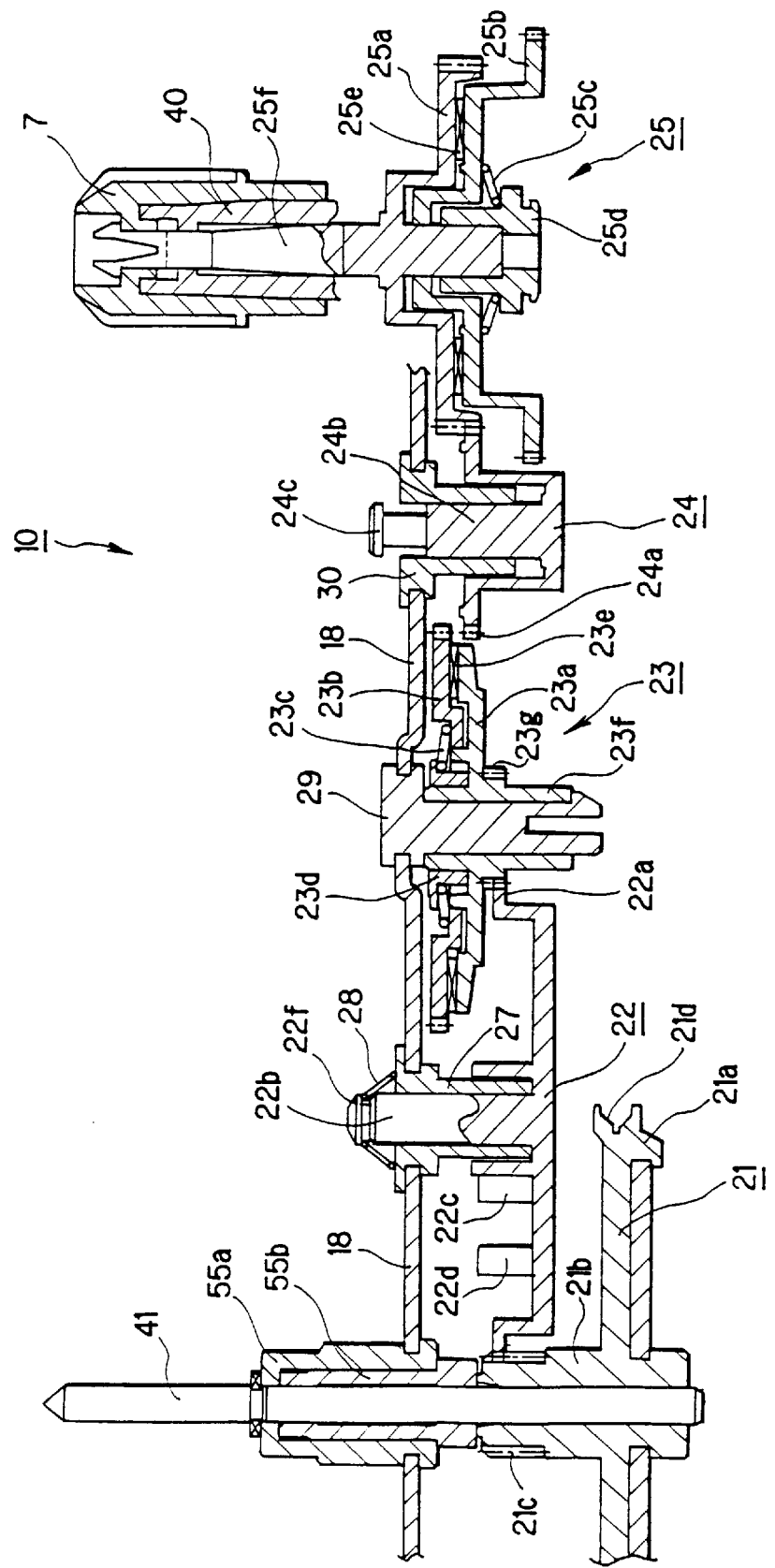
FIG. 3 is a longitudinal cross-sectional view showing the reel driving unit.
Figure 4:
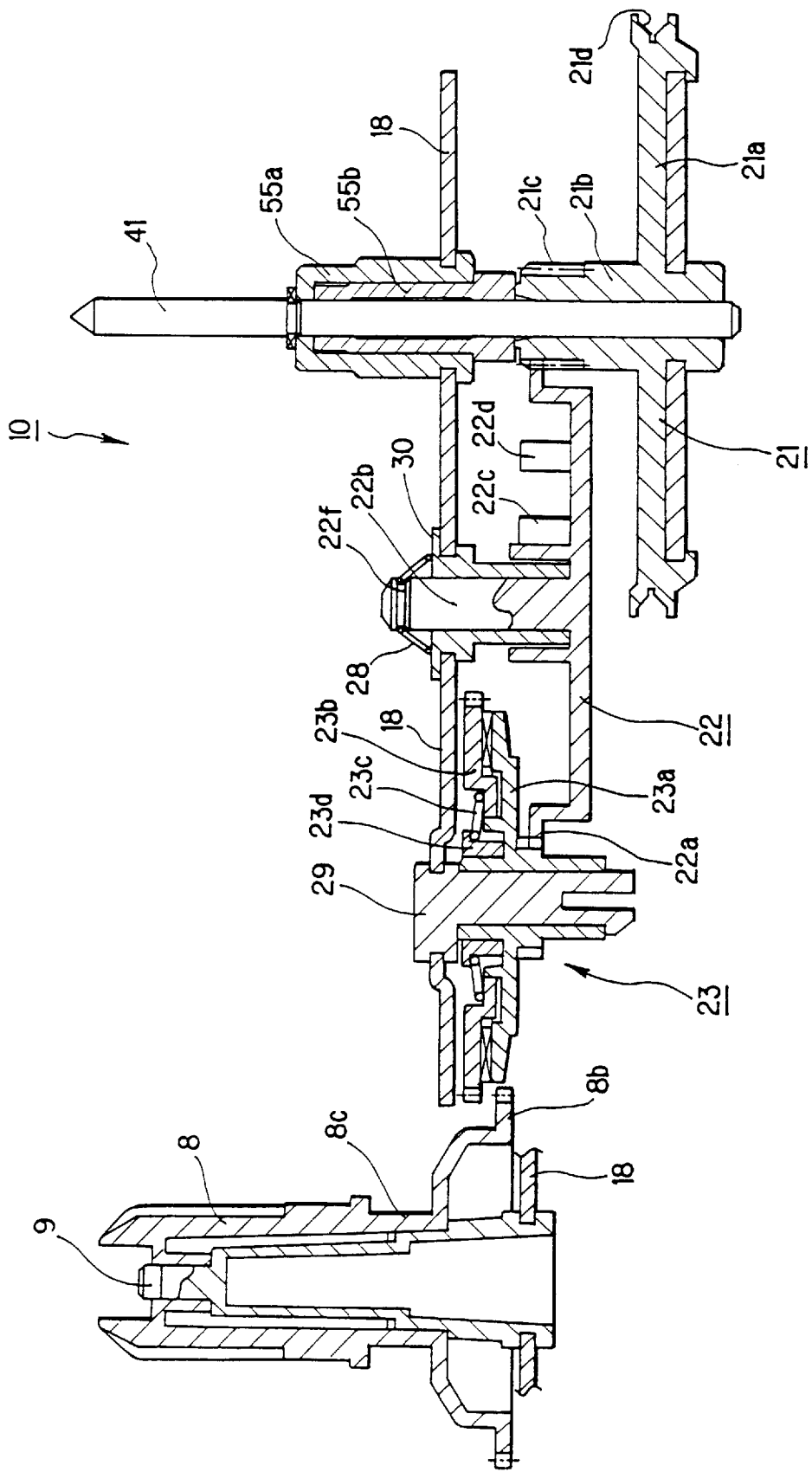
FIG. 4, similar to FIG. 3, is a longitudinal cross-sectional view showing the reel driving unit.

Referring to FIGS. 2, 3 and 4, the reel driving unit 10 includes a takeup side reel block 7 and a supply side reel block 8 on which are set and run tape reels carrying a takeup side tape reel and a supply side tape reel of the tape cassette, respectively. The reel driving unit 10 also includes a driving motor 20 connected to a power source, not shown, and a flywheel 21 run in rotation by the driving motor 20. The reel driving unit 10 also includes a cam gear 22 to which is transmitted the driving power of the flywheel 21, and a first gear train 23 to which is transmitted the driving power of the driving gear 22. The reel driving unit 10 further includes an idler gear 24, to which is transmitted the driving power of the first gear train 23, and a second gear train 25, to which is transmitted the driving power of the idler gear 24, for rotating the takeup side reel block.

Referring to FIG. 3, the takeup side reel block 7 is fixedly mounted on the second gear train 25 for rotation in unison therewith. The supply side reel block 8 includes a base 8a rotatably supported on a chassis 18, a gear portion 8b formed on the base 8a and to which is transmitted the driving power of the first gear train 23, and an operating portion 8c formed on the outer periphery of the base 8a and which is moved by a rewind operating lever 34 of a rewind unit 14 as later explained.

The driving motor 20 has a pulley 20b mounted on a rotary shaft 20a and is provided on the chassis 18.

The flywheel 21 has a disc-shaped base portion 21a, a cylindrical bearing 21b formed as one with the center of the base portion 21a, and a gear portion 21c provided on the outer periphery of the bearing portion 21b.

In the outer rim part of the base portion 21a is formed a belt groove 21d. A belt 26 is placed across this belt groove 21d and the pulley 20b of the driving motor 20. The bearing 21b is secured to the proximal end of a capstan arbor 41 of a reproducing unit 11 rotatably mounted on the chassis 18 and is rotated in unison with the capstan arbor 41. The gear 21c is formed with a pre-set width to keep the gear portion 21c engaged with the cam gear 22 even if the cam gear 22 as later explained is moved.

The cam gear 22 has a gear part 22a meshing with the gear portion 21c of the flywheel 21, a cylindrical supporting shaft 22b formed as one with the center of the gear portion 22a and an engagement protrusion 22d protruded as one with the outer rim of the cam 22c.

The gear portion 22a meshes with the first gear train 23 or with the second gear train 25. The supporting shaft 22b is rotatably mounted on the chassis 18 via a bearing member 27. The distal end of the supporting shaft 22b is formed with a spring retention groove 22f in which is engaged one end of a coil spring 28, the other end of which is compressed against the bearing member 27. Thus the cam gear 22 is biased to slide along the axis of the supporting shaft 22b under the resiliency of the coil spring 28.

The first gear train 23 includes a first gear 23a to which is transmitted rotation of the cam gear 22, a second gear 23b having its center of rotation coincident with that of the first gear 23a, a coil spring 23c thrusting the second gear 23b against the first gear 23a, a bushing 23d for supporting the coil spring 23c and a felt 23e for permitting one of the first gear 23a and the second gear 23b to be rotated independently of the other.

The first gear 23a has a cylindrical shaft supporting portion 23f at its center. This shaft supporting portion 23f is rotatably supported on a supporting shaft 29 set upright on the chassis 18. On the outer rim of the shaft supporting portion 23f of the first gear 23a is provided a gear portion 23g.

The second gear 23b is provided on the first gear 23a for meshing with an idler gear 24 or the gear portion 8b of the supply side reel block 8. This second gear 23b has teeth for meshing with the idler gear 24, with every other tooth of the second gear 23 being interrupted.

By the second gear portion 23b thus having every other tooth interrupted, the risk of the idler gear 24 slid in the axial direction riding over the gear portion 8b of the supply side reel block 8 or vice versa may be eliminated when the idler gear meshes with the gear portion 8b thus improving meshing of the idler gear 24 with the gear portion 8b of the supply side reel block 8.

The coil spring 23c has its one end abutted against the second gear 23b while having its other end abutted against the bushing 23d. The bushing 23d is fixed to the outer rim of the shaft portion 23f of the first gear 23a for supporting the coil spring 23c. Thus the coil spring 23c thrusts the second gear 23b against the first gear 23a under its resiliency.

The felt 23e is annular and is positioned between the first gear 23a and the second gear 23b. This felt 23e operates as a clutch by its force of friction relative to the first gear 23a and the second gear 23b to cause the first gear 23a and the second gear 23b to be rotated in unison with each other. In addition, the felt 23e permits one of the first and second gears 23a, 23b to be rotated relative to the other gear independently when the force of rotation exceeding the force of friction is imparted to one of the gears 23a, 23b. Thus, the felt 23e permits one of the first gear 23a and the second gear 23b to be rotated in idleness relative to the other when the first gear 23a meshes with the second gear 23b.

The idler gear 24 includes a gear portion 24a, to which rotation is transmitted from the first gear train 23, a supporting shaft 24b formed as one with the center of the gear portion 24a, and a movement rib 24c for permitting the idler gear 24 to be moved by a fast feed lever 33 of a fast feed operating lever 13 as later explained.

The gear portion 24a is provided at a position of meshing with the second gear 23b of the first gear assembly 23. The supporting shaft 24b is slidably both rotatably and axially mounted in the axial direction on a bearing member 30 provided on the chassis 18. The movement rib 24c is mounted as one coaxially with the supporting shaft 24b.

The second gear train 25 includes a fast feed gear 25a for running the takeup side reel block 7 in rotation, a playback gear 25b, a coil spring 25c for thrusting the playback gear 25b against the fast feed gear 25a, a bushing 25d for supporting the coil spring 25c and a felt 25e for allowing one of the fast feed gear 25a and the playback gear 25b to be rotated independently of the other.

A supporting shaft 25f is formed as one at the center of the fast feed gear 25a. On one end of the supporting shaft 25f is secured the takeup side reel block 7 on which is set the takeup side tape reel of the tape cassette. The fast feed gear 25a has its supporting shaft 25f rotatably mounted on a bearing member 40 provided on the chassis 18.

The playback gear 25b has a tooth diameter larger than that of the fast feed gear 25a and is rotatably mounted on the supporting shaft 25f of the fast feed gear 25a.

The coil spring 25c has its one end abutted against the playback gear 25b while having its opposite end abutted against the bushing 25d. This coil spring 25c thrusts the playback gear 25b against the fast feed gear 25a by its resiliency.

Figure 9:
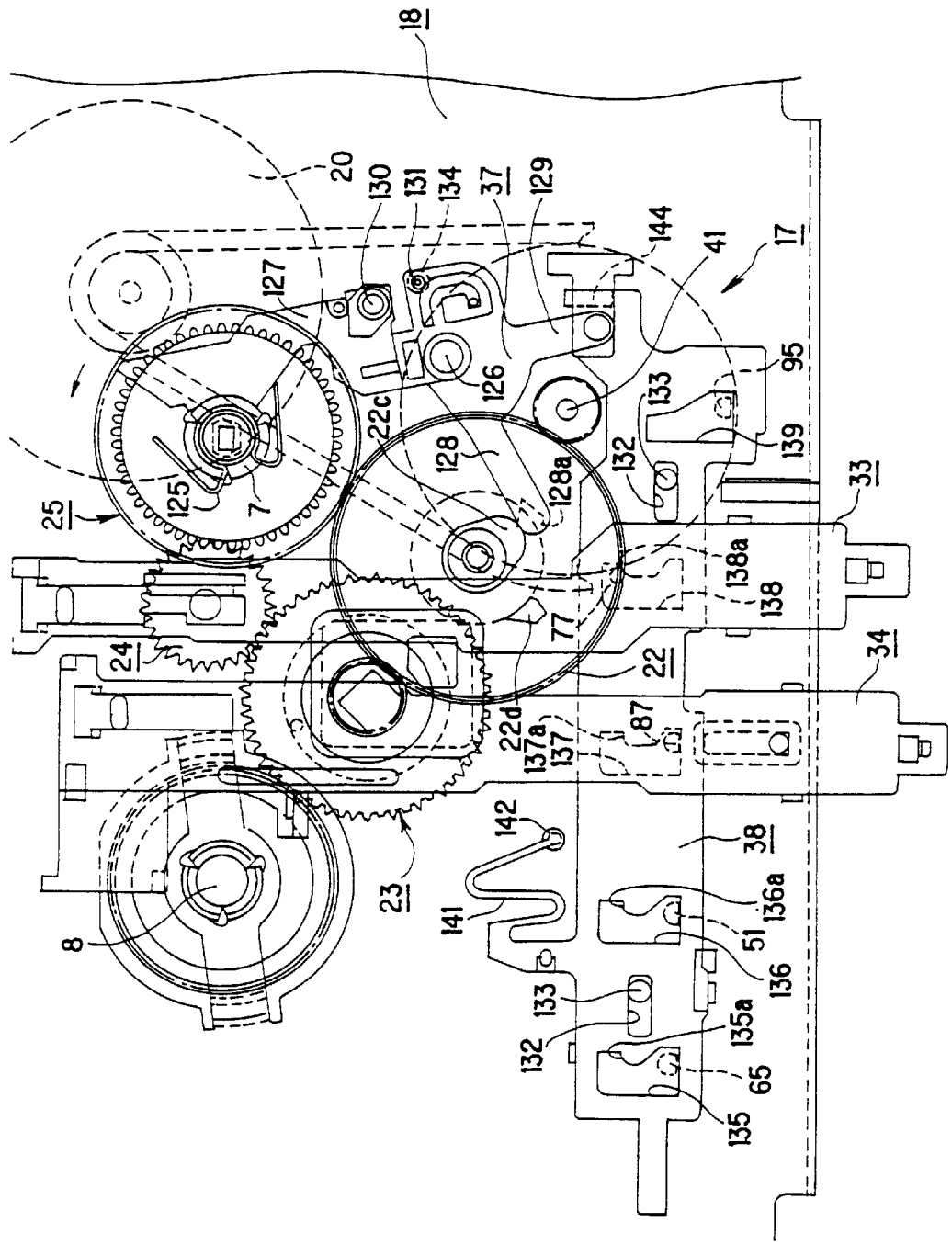
FIG. 9 is a plan view for illustrating the automatic stop mechanism provided in the tape recorder.

The bushing 25d is secured to the opposite end of the supporting shaft 25f of the fast feed gear 25a and is fitted with a torsion spring 125 of the automatic stop unit 17, as later explained and as shown in FIG. 9.

The felt 25e is annular and is positioned between the fast feed gear 25a and the playback gear 25b. This felt 25e operates as a clutch by its force of friction relative to the fast feed gear 25a and the playback gear 25b to cause the fast feed gear 25a and the playback gear 25b to be rotated in unison with each other. In addition, the felt 25e permits one of the fast feed gear 25a and playback gear 25b to be rotated relative to the other gear independently when a force of rotation exceeding the force of friction is imparted to one of the gears 25a, 25b.

[3] Structure of the Reproducing Unit

Figure 5:
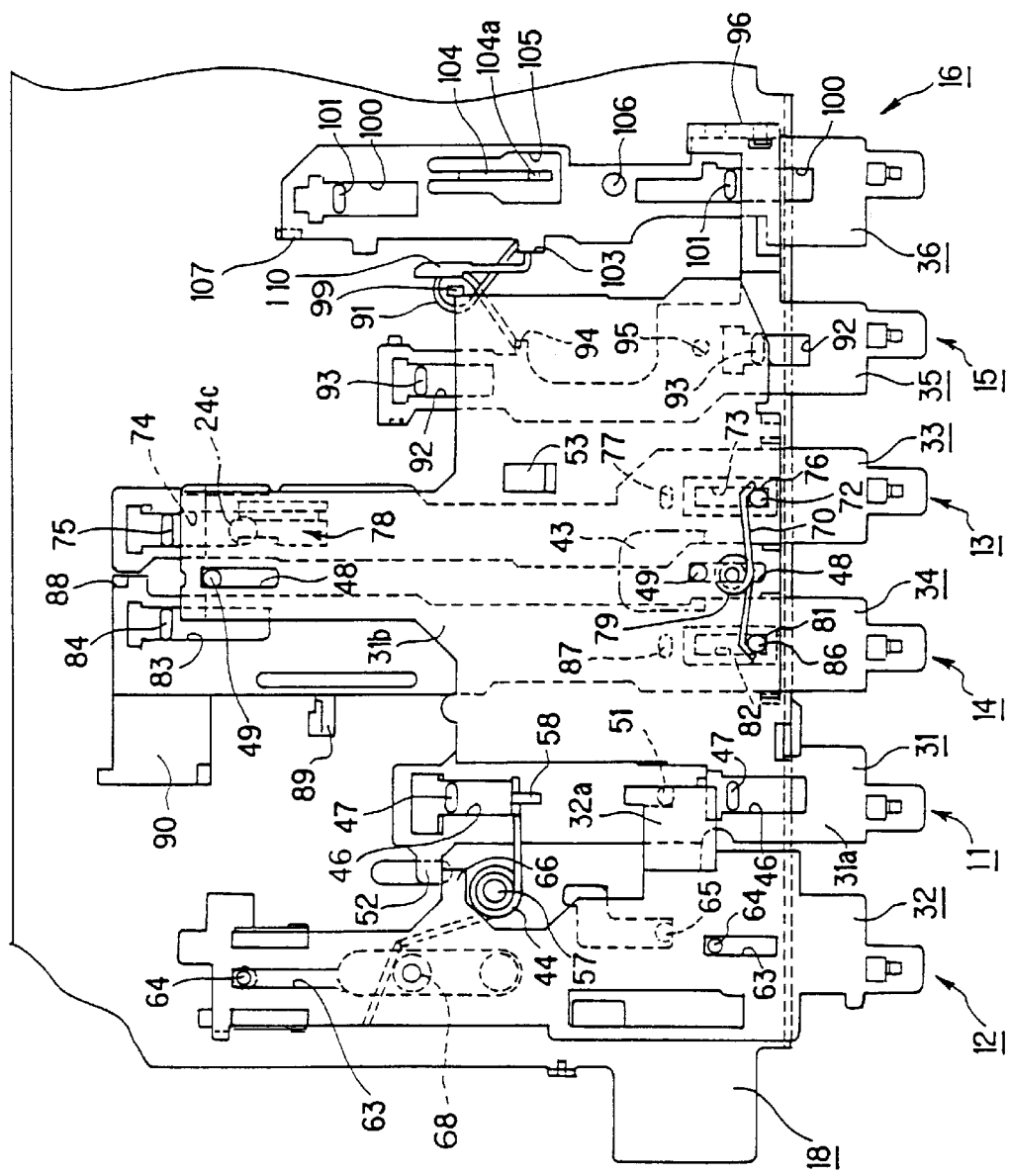
FIG. 5 is a plan view showing operating levers of respective units of the tape recorder.
Figure 6:
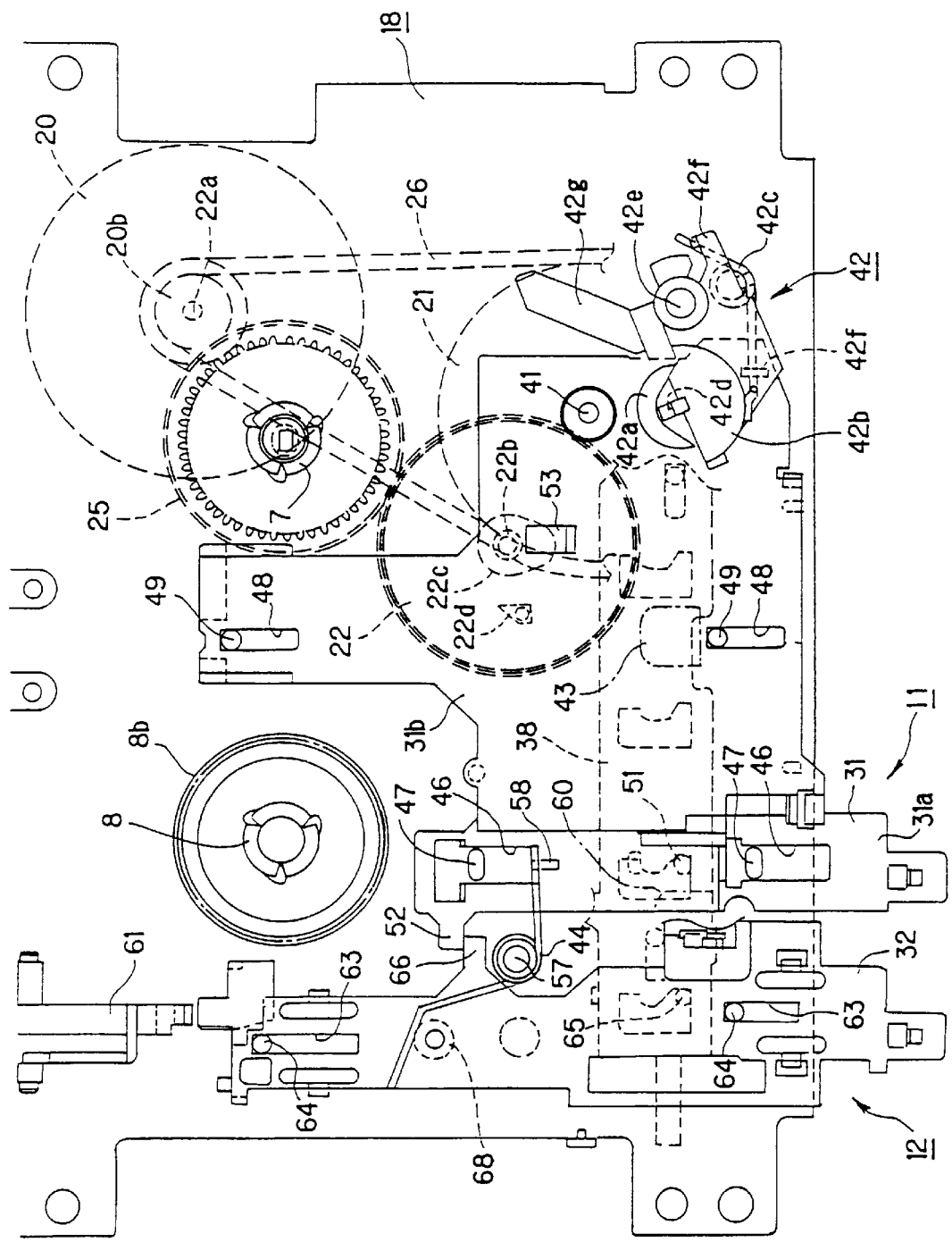
FIG. 6 is a plan view for illustrating a reproducing unit and a recording unit provided in the tape recorder.

Referring to FIGS. 5 and 6, the playback unit 11 includes a playback operating lever 31, operated on being thrust, a capstan arbor 41 for running the magnetic tape in rotation, a pinch roll unit 42 for holding a magnetic tape between it and the capstan arbor 41, a recording/reproducing magnetic head 43 for recording and/or reproducing information signals on or from the magnetic tape, and a torsion spring 44 for biasing the thrust playback operating lever 31 towards its initial position.

The playback operating lever 31 includes a base portion 31a, operated on being thrust, and a head supporting portion 31b formed as one with the base portion 31a for supporting the recording and/or reproducing magnetic head 43. The base portion 31a is formed of a resin material, such as plastics, in a substantially rectangular form.

This recording and/or reproducing magnetic head 43 is fed, during recording, with a recording signal derived from audio signals, as a signal to be recorded on a magnetic tape. During reproduction, a signal corresponding to the read-out signal from the magnetic tape, is outputted to a recording and/or reproducing circuit, not shown, from the magnetic head 43.

In the major surface of the base portion 31a of the playback operating lever 31 are formed guide slits 46, 46 passed through by guide ribs 47, 47, set upright on the chassis 18, for movement therein. In the head supporting portion 31b of the playback operating lever 31 are formed guide slots 48, 48 passed through by guide ribs 49, 49, set upright on the chassis 18, for sliding therein. That is, the playback operating lever 31 is slidably arranged on the chassis 18.

Although not shown, plural engagement pawls slidably engaging with the engaging slits formed in the chassis 18 are formed as one with the playback operating lever 31. Also, plural abutment ribs, not shown, abutted on the chassis 18 for sliding are formed as one with the major surface of the playback operating lever 31 for providing a pre-set facing distance from the chassis 18.

The major surface of the base portion 31a of the playback operating lever 31 is formed as one with a lock rib 51 adapted for locking on being thrust. On the lateral side of the base portion 31a adjacent to the recording operating lever 32 of the recording unit 12, as later explained, there is mounted as one with the base portion 31a a recording operating lever 32 of the recording unit 12, as shown in FIG. 6.

On the head supporting portion 31b of the playback operating lever 31 is protuberantly formed an operating lug 53 in register with the supporting shaft 22b of the cam gear 22 of the reel driving unit 10. When the playback operating lever 31 is thrust, the operating lug 53 is compressed against the distal end of the supporting shaft 22b of the cam gear 22 to cause the cam gear 22 to be slid along the axis of the supporting shaft 22b.

The base portion 31a of the playback operating lever 31 is formed as one with a spring retention rib 58 designed for retaining one end of a torsion coil spring 44.

A capstan arbor 41 is rotatably mounted via bearing members 55a, 55b provided on the chassis 18, as shown in FIG. 4. The bearing member 55b is formed by a metallic material.

The pinch roll unit 42 includes a pinch roll 42a abutted against the capstan arbor 41 with a magnetic tape in-between, a holder 42b for holding the pinch roll 42a and a torsion spring 42c for biasing the holder 42b in a direction of rotating the holder 42b.

The pinch roll 42a is formed in a cylindrical shape from, for example, synthetic rubber, and has a rotary shaft 42d at its mid portion. This pinch roll 42a is supported by a rotary shaft 42d via rotary shaft 42d.

The holder 42b is rotatably supported on a supporting shaft 42e set upright on the chassis 18. This holder 42b is formed as one with a spring mounting rib adapted for mounting the torsion spring 42c. The torsion spring 42c is formed with protuberant retention pieces 42f, 42f adapted for retaining both ends thereof.

The torsion spring 42c is mounted on a mounting rib of the holder 42b and has its both ends retained by retention pieces 42f, 42f of the holder 42b. The torsion coil spring 42c biases the pinch roll 42a supported by the holder 42b in a direction of rotation opposite to the direction of compression against the capstan arbor 41.

The torsion spring 42c has its end inserted through an operating slit, not shown, formed in the playback operating lever 31. Thus, when the playback operating lever 31 is thrust, the holder 42b is swung via an end of the torsion spring 42c.

This holder 42b is formed as one with an oscillation operating lever 42g oscillated by a pause operating lever 36 of the pause stop unit 16 as later explained.

A recording/reproducing magnetic head 43 is mounted on a head supporting portion 31a of a playback operating lever 31 and is moved as one with the playback operating lever 31.

A torsion spring 44 has its coil portion fitted on a spring mounting rib 57 set upright on the chassis 18 and has its one end retained by a spring retention rib 58 of the playback operating lever 31. This torsion spring 44 resets the thrust playback operating lever 31 to its initial position by its resiliency.

[4] Structure of the Recording Unit

The recording unit 12 includes a recording operating lever 32, operated on being thrust, an erasure magnetic head 60 for erasing information signals on a recording tape, and an inadvertent erasure preventive lever 61 for preventing inadvertent erasure of information signals recorded on the magnetic tape.

The recording operating lever 32 is formed substantially in a rectangular shape and is formed as one with a head supporting piece 32a supporting the erasure magnetic head 60.

The major surface of the recording operating lever 32 is formed with guide slits 63, 63 in which are slidably inserted guide ribs 64, 64 set upright on the chassis 18. That is, the recording operating lever 32 is slidably mounted on the chassis 18.

On the major surface of the recording operating lever 32 is set upright a lock rib 65 adapted for locking when thrust.

This lock rib 65 is slidably passed through a guide slit, not shown, formed in the chassis 18. On a lateral side of the recording operating lever 32 adjacent to the operating actuating lever 31 is protuberantly formed an operating piece 66 adapted for actuating an operating piece 52 of the playback operating lever 31.

On the major surface of the recording operating lever is integrally formed upright a retention rib 68 adapted for retaining an end of a torsion spring 44 of the above-described playback operating unit 11. The recording operating lever 32, once thrust, can be reset to its initial position under resiliency of the torsion spring 44. An operating piece 66 of the recording operating lever 32 perpetually compresses against the operating piece 52 of the playback operating piece 31 under resiliency of the torsion spring 44.

Although not shown, a plurality of engagement pawls are formed as one on the recording operating lever 32. The engagement pawls are slidably engaged in engagement slits formed in the chassis 18. A plurality of abutment ribs, also not shown, are mounted upright as one on the major surface of the recording actuating lever 32 to assure a pre-set facing distance from the chassis 18.

The erasure magnetic head 60 has an erasure magnet, not shown, at a position facing the magnetic tape, for erasing information signals recorded on the magnetic tape. The erasure magnet is mounted stationarily on the hear supporting piece 32a.

An inadvertent erasure preventing lever 61 is rotatably mounted on the chassis at an end of the recording operating lever 32. This inadvertent erasure preventing lever 61 compresses against the end of the recording operating lever 32 to render it impossible to thrust the recording operating lever 32. When recording information signals on the magnetic tape, this inadvertent erasure preventing lever 61 is rotated to a position not abutted against the end of the recording operating lever 32 to enable the thrusting of the recording operating lever 32. The inadvertent erasure preventing lever 61 is rotated between a position abutted against the recording operating lever 32 and a position not abutted against the recording operating lever 32 depending on the state of an inadvertent erasure detection unit, for example, depending on whether recording is possible.

[5] Structure of the Fast Feed Unit

Figure 7:
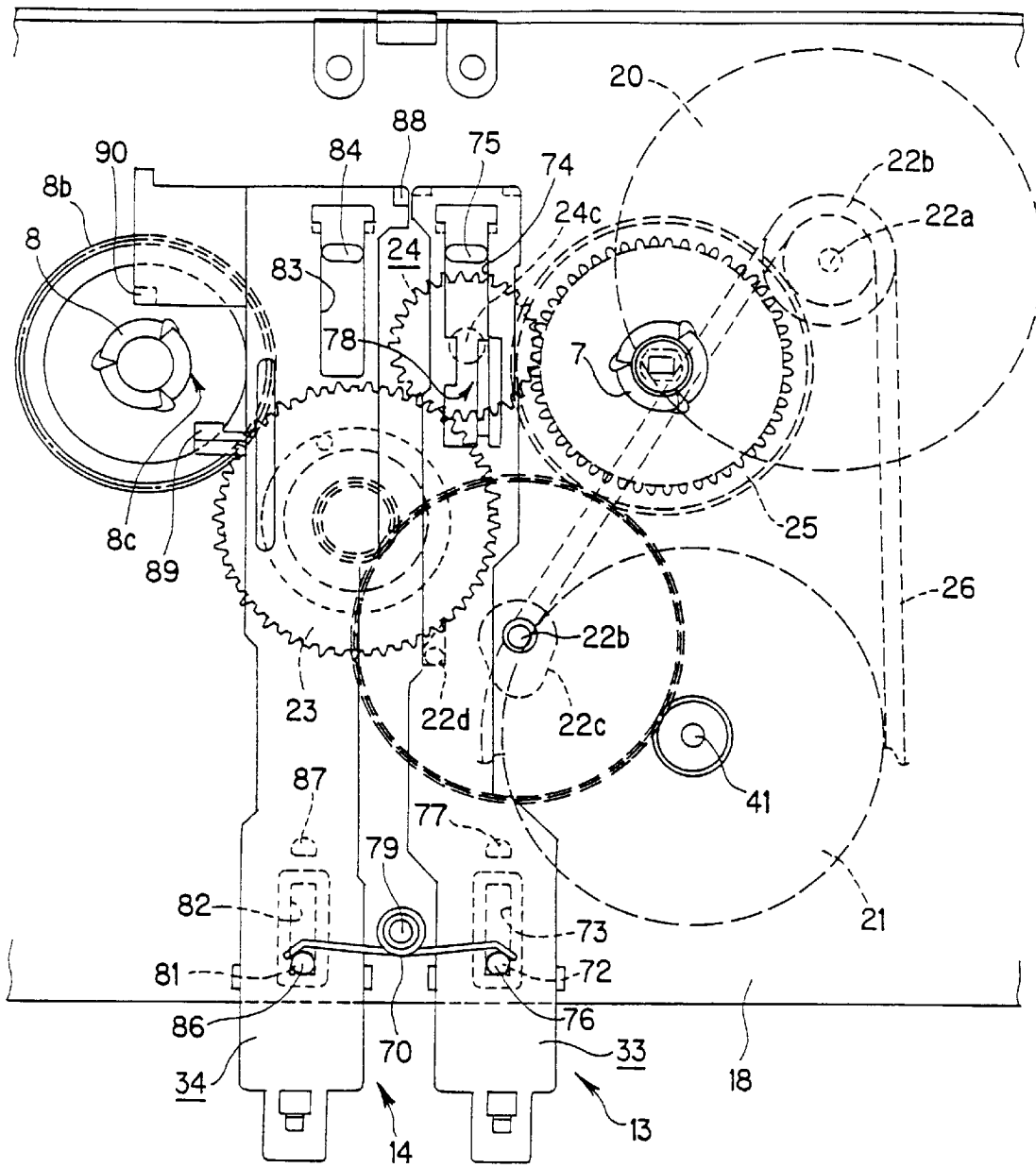
FIG. 7 is a plan view for illustrating the fast feed unit and the rewind unit provided in the tape recorder.

The fast feed unit 13 includes a fast feed operating lever 33, operated on being thrust, and a torsion spring 70 for biasing the thrust fast feed operating lever 33 towards its initial position, as shown in FIGS. 5 and 7.

The fast feed operating lever 33 is formed of a resin material, such as plastics, in a substantially rectangular shape. On the major surface of the fast feed operating lever 33 is formed upright a guide rib 72 slidably inserted in a guide slit 73 formed in the chassis 18. Thus, the fast feed operating lever 33 is slidably mounted on the chassis 18.

Although not shown, a plurality of engagement pawls are formed as one on the fast feed operating lever 33. The engagement pawls are slidably engaged in engagement slits formed in the chassis 18. A plurality of abutment ribs, also not shown, are mounted upright as one on the major surface of the fast feed operating lever 33 to assure a pre-set facing distance from the chassis 18.

On the major surface of the fast feed operating lever 33 is set upright a spring retention rib 76 biased by a torsion spring 70.

On the major surface of the fast feed operating lever 33 is set upright a lock rib 77 for assuring the thrust position. This lock rib 77 is slidably passed through a guide slit, not shown, formed in the chassis 18.

On the major surface of the fast feed operating lever 33 is formed a gear operating unit 78, in continuation to the guide slit 74, for moving the idler gear 24 of the reel driving unit 10. When the fast feed operating lever 33 is thrust, the gear operating unit 78 compresses against the movement rib 24c of the idler gear 24 to move the movement rib 24c along the axis of the idler gear 24.

The torsion spring 70 has its coil portion fitted on a spring mounting rib 79 set upright on the chassis 18, and has its end retained by a spring retention rib 76 of the fast feed operating lever 33. Thus, the torsion spring 70 resets the fast feed operating lever 33, once thrust, to the initial position under its resiliency.

[6] Structure of the Rewind Unit

The rewind unit 14 includes a rewind operating lever 34, operated on being thrust, as shown in FIGS. 5 and 7.

On the major surface of the rewind operating lever 34 is formed upright a guide rib 81 slidably inserted in a guide slit 82 formed in the chassis 18 for slidably supporting the rewind operating lever 34 on the chassis 18.

In the major surface of the rewind operating lever 34 is formed a guide slit 83 into which is slidably inserted a guide rib 84 set upright on the chassis 18. Therefore, the rewind operating lever 34 is slidably mounted on the chassis 18.

Although not shown, a plurality of engagement pawls are formed as one on the rewind operating lever 34. The engagement pawls are slidably engaged in engagement slits formed in the chassis 18. A plurality of abutment ribs, also not shown, are mounted upright as one on the major surface of the rewind operating lever 34 to assure a pre-set facing distance from the chassis 18.

On the major surface of the rewind operating lever 34 is formed upright a spring retention rib 86 retaining the opposite end of the above-mentioned torsion spring 70. Thus, the rewind operating lever 34, once thrust, is reset to the initial position under the resiliency of the torsion spring 70.

On the major surface of the rewind operating lever 34 is formed upright a lock rib 87 for holding the thrust position. This lock rib 87 is slidably inserted in a guide slit, not shown, formed on the chassis 18.

On one end of the rewind operating lever 34 is protuberantly formed a regulation lug 88 for regulating the movement of a reel lock slider 98 of the pause unit 16 as later explained.

A reel actuating pawl 89 for moving the supply side reel block 8 is protuberantly formed as one with the lateral side of the rewind operating lever 34 adjacent to the operating portion 8c of the supply side reel block 8. On the opposite side of the supply side reel block 8 is protuberantly formed a reel actuating piece 90 for moving the supply side reel block 8.

[7] Structure of the Stop Unit

The stop unit 15 includes a stop actuating lever 35, actuated on being thrust, and a torsion spring 91 for biasing the stop actuating lever 35, actuated on being thrust, to the initial position, as shown in FIG. 5.

The stop actuating lever 35 is formed of, for example, a resin material, such as plastics. In the major surface of the stop actuating lever 35 are formed guide slits 92, 92 in which are movably inserted guide ribs 93, 93 set upright on the chassis 18. Thus, the stop operating lever 35 is slidably mounted on the chassis 18.

Although not shown, a plurality of engagement pawls are formed as one on the stop operating lever 35. The engagement pawls are slidably engaged in engagement slits formed in the chassis 18. A plurality of abutment ribs, also not shown, are mounted upright as one on the major surface of the stop operating lever 35 for assuring a pre-set facing distance from the chassis 18.

A spring retention rib 94 for retaining one end of the torsion coil spring 91 is protuberantly formed as one on the stop actuating lever 35.

On the major surface of the stop actuating lever 35 is set upright an actuating rib 95 for moving a lever lock slider 38 of the automatic stop unit 17 as later explained. The actuating rib 95 is slidably inserted in a guide slit, not shown, formed in the chassis 18.

The stop actuating lever 35 is formed as one with a substantially L-shaped operator for actuating a lock member for locking the cassette holder, although the lock member is not shown.

The torsion coil spring 91 is mounted on a spring mounting rib 99 set upright on the chassis 18 and has its one end retained by the spring retention rib 94 of the stop actuating lever 35. Thus, the torsion coil spring 91 resets the thrust stop actuating lever 35 to the initial position under its resiliency.

[8] Structure of the Pause Unit

Figure 8:
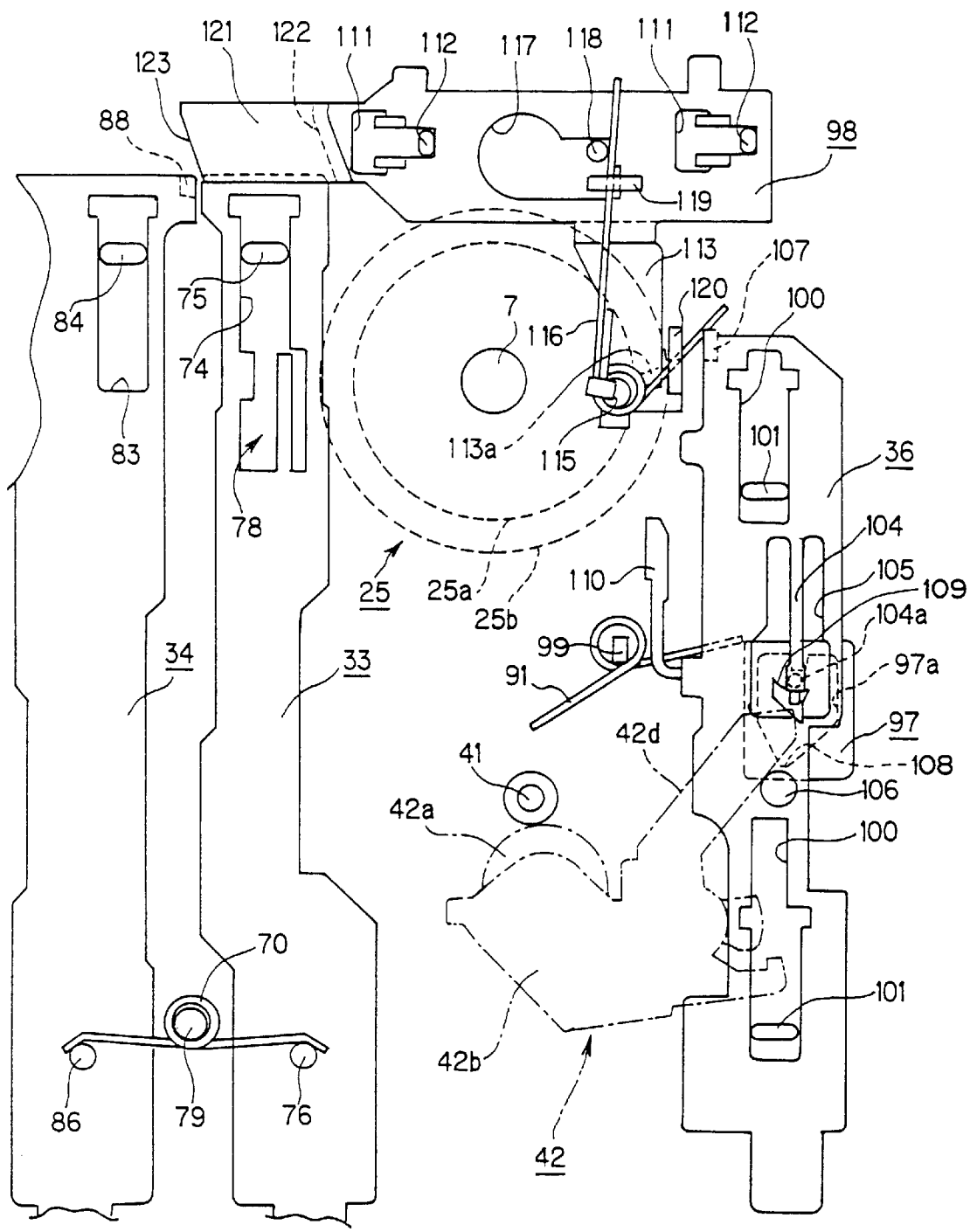
FIG. 8 is a plan view for illustrating the pause unit provided in the tape recorder.

The pause unit 16 includes a pause actuating lever 36, actuated on being thrust, a lock plate 97 for locking the thrust pause actuating lever 36,and a reel lock slider 98 for regulating the rotation of the supply side reel block 8 adapted for rotating the supply side tape reel for the tape cassette, as shown in FIGS. 5 and 8.

In the major surface of the pause lever 36 are formed guide slits 100, 100 in which are slidably inserted guide ribs 101, 101 set upright on the chassis 18. Thus, the pause lever 36 is slidably arranged on the chassis 18.

Although not shown, a plurality of engagement pawls are formed as one on the pause operating lever 36. The engagement pawls are slidably engaged in engagement slits formed in the chassis 18. A plurality of abutment ribs, also not shown, are mounted upright as one on the major surface of the pause operating lever 36 for assuring a pre-set facing distance from the chassis 18.

The major surface of the pause operating lever 36 is formed as one with a spring retainer 103 engaged by one end of the torsion spring 91. Thus, the thrust pause actuating lever 36 is reset to the initial position under its resiliency.

On the pause operating lever 36 is mounted a lock piece 104 flexibly movable for holding the thrust position. Around this lock piece 104 is formed an opening 105 enabling such movement of the lock piece 104. On the distal end of the lock piece 104 is set upright an actuating rib 106 for moving the oscillation actuating arm 42d of the holder 42b constituting the pinch roll unit 42 of the above-mentioned playback operating unit 11.

On the pause operating lever 36 is set upright an actuating rib 106 for moving the oscillating actuating arm 42d of the holder 42b constituting the pinch roll unit 42 of the reproducing unit 11 as described above.

The pause actuating lever 36 is formed as one with an operating lug 107 for moving the reel lock slider 98.

On the lateral end of the pause lever 36 is flexibly movably formed an actuating arm 110 for actuating a shut-off lever 37 of the automatic stop unit 17 as later explained.

Referring to FIG. 8, the lock plate 97 is formed as a substantially rectangular plate and has in its major surface a substantially annular cam groove 97a. On the inner peripheral wall of the cam groove 97a is formed a first engagement section 108 engaged by an engagement pin 104a of the lock piece 104 of the pause actuating lever 36, whereas, on the mid portion thereof, a second engagement section 109 is engaged by the engagement pin 104a of the lock piece 104 of the thrust pause actuating lever 36. These first and second engagement sections 108, 109 are formed on straight lines extending parallel to the sliding direction of the pause actuating lever 36.

The reel lock slider 98 is formed of, for example, a resin material, such as plastics, as shown in FIG. 8. In the major surface of the reel lock slider 98 are formed guide slits 111, 111 in which are slidably inserted guide ribs 112, 112 set upright on the chassis 18. Thus, the reel lock slider 98 is slidably mounted on the chassis 18.

A plurality of abutment ribs, also not shown, are mounted upright as one on the reel lock slider 98 to slide on abutting contact with the chassis 18 for assuring a pre-set facing distance from the chassis 18.

The reel lock slider 98 is formed as one with a lock piece 113 engaged with a fast feed gear 25a of the second gear train 25 adapted for rotating the takeup side reel block 7. This lock piece 113 is formed as one with a lock pawl 113a facing the fast feed gear 25a of the second gear train 25. This lock pawl 113a is engaged with the fast feed gear 25a for disabling rotation of the takeup side reel block 7.

The reel lock slider 98 is formed as one with a spring mounting rib 115 fitted with a torsion spring 116.

In the major surface of the reel lock slider 98 is formed an opening 117 in which is slidably inserted a spring retention rib 118 set upright on the chassis 18. This spring retention rib 118 holds one end of the torsion spring 116.

The reel lock slider 98 is formed at a position thereof neighboring to the spring retention rib 118 with a spring retention piece 119 adapted for retaining a mid portion at one end of the torsion spring 116. The lock piece 113 is formed as one with a spring retainer 120 adapted for holding a mid portion of the opposite end of the torsion spring 116.

The torsion spring 116 has its one end retained by spring retention ribs 118 and 119. The torsion spring 116 also has its opposite end retained by a spring retainer 120 and protruded to a position facing the actuating lug 107 of the pause lever 36 for compressing against the actuating lug 107 of the thrust pause actuating lever 36.

Thus, the torsion spring 116 biases the reel lock slider 98 by its resiliency for moving the fast feed gear 25a of the second gear train 25 in a direction of separating the lock pawl 113a of the lock piece 113 of the reel lock slider 98. The second gear train is configured for rotating the takeup side reel block 7.

On one end of the reel lock slider 98 facing the stop actuating lever 35 is integrally formed an abutment portion 121 having a substantially L-shaped cross-section. This abutment portion 121 is formed with a first abutting wall section 122 compressing against the fast feed actuating lever 33 and a second abutting wall section 123 compressing against the rewind actuating lever 34.

With the fast feed actuating lever 33 thrust, the fast feed actuating lever 33 is abutted against the first abutting wall section 122 of the abutment portion 121 for regulating the movement of the reel lock slider 98 to disable its sliding.

[9] Structure of the Automatic Stop Unit

Figure 10:
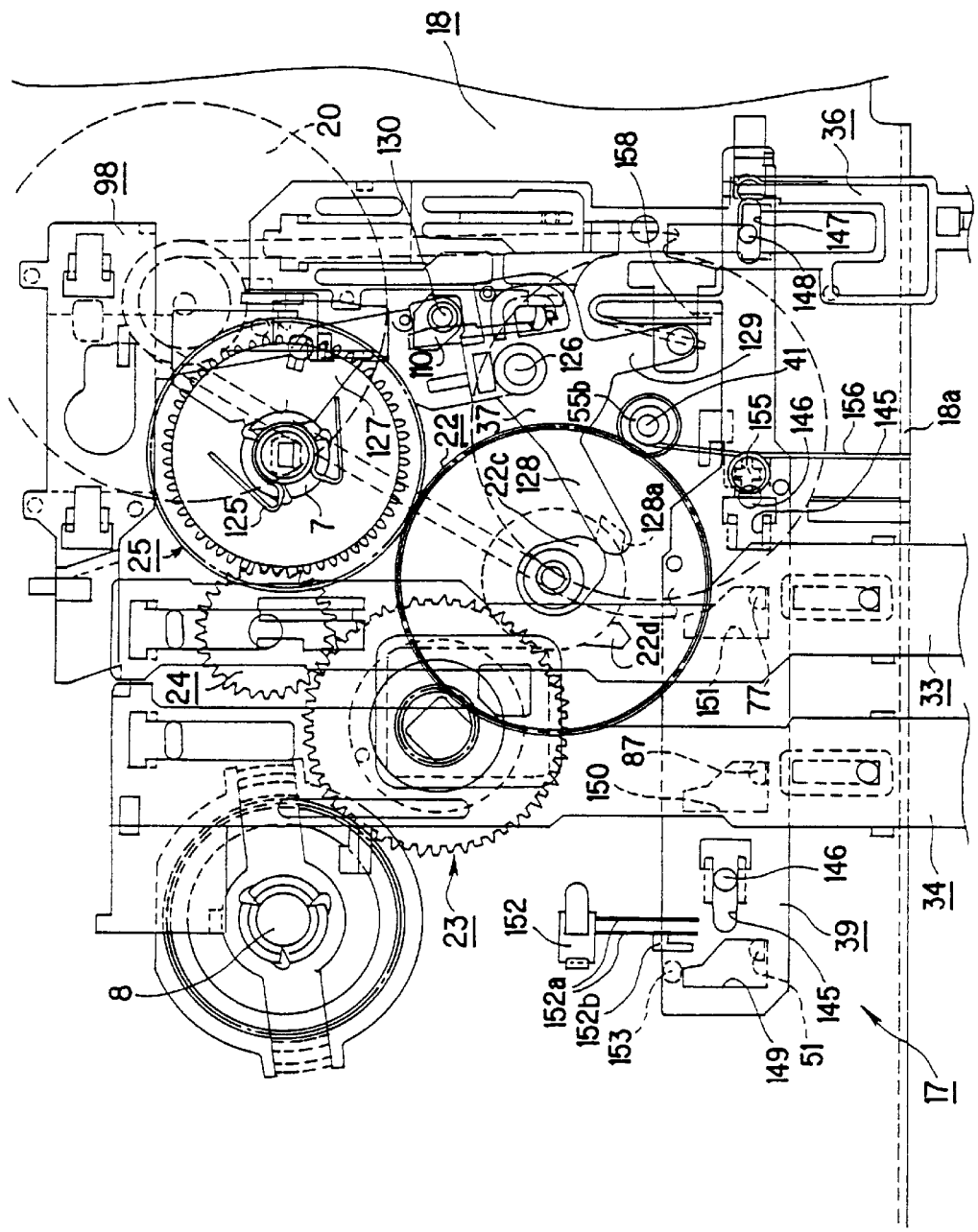
FIG. 10, similar to FIG. 9, is a plan view for illustrating the automatic stop mechanism provided in the tape recorder.

The automatic stop unit 17 includes a shut-off lever 37 for automatically resetting the actuating levers 31 to 35 to the initial positions on termination of rewind operation of the magnetic tape, a lever lock slider 38 for locking the thrust actuating levers 31 to 34 in the as-thrust state, a switch slider 39 for stopping rotation of the driving motor 20 of the reel driving unit 10, and a torsion spring 125 for biasing the shut-off lever into rotation, as shown in FIGS. 5, 9 and 10.

The shut-off ever 37 is formed of a resin material, such as plastics, and has its mid portion rotatably supported by a pivot support shaft 126 set upright on the chassis 18.

This shut-off lever 37 is formed as one with the oscillating actuating unit 127 resiliently biased by the torsion spring 125.

The shut-off lever 37 is formed at a position registering with the cam gear 22 of the reel driving unit 10 with a cam arm section 128 the distal end of which is formed as one with a substantially vee-shaped engagement grove 128a engaged by an engagement lug 22d of the cam gear 22.

The shut-off lever 37 is formed as one with an actuating portion 129 for moving the lever lock slider 38.

On the shut-off lever 37 is set upright an actuating rib 130 actuated by an actuating arm 110 of the pause actuating lever 36. This actuating rib 130 is inserted into a guide slit, not shown, formed in the chassis 18 for movement therein.

The shut-off lever 37 is formed with a spring mounting portion 131 for mounting an end of a position-regulating coil spring 134 configured for regulating the position of the shut-off lever 37 to a pre-set position. This position-regulating coil spring 134 has its opposite end mounted on a mounting rib, not shown, provided on the chassis 18.

The lever lock lever 38 is formed as a substantially rectangular plate in which are formed guide slits 132, 132 into which are slidably inserted guide ribs 133, 133 set upright on the chassis 18. That is, the lever lock slider 38 is slidably arranged on the chassis 18.

Although not shown, a plurality of engagement pawls are formed as one on the lever lock slider 38. The engagement pawls are slidably engaged in engagement slits formed in the chassis 18. A plurality of abutment ribs, also not shown, are mounted upright as one on the major surface of the lever lock slider 38 to assure pre-set facing distance from the chassis 18.

Referring to FIG. 9, the lever lock slider 38 has, in its major surface, a lock opening 135 passed through by a lock rib 65 of the recording actuating lever 32, a lock opening 136 passed through by a lock rib 51 of the playback actuating lever 31, a lock opening 137 passed through by a lock rib 87 of the rewind actuating lever 34, and a lock opening 138 passed through by a lock rib 77 of the fast feed actuating lever 33.

These lock openings 135 to 138 are substantially C-shaped and are formed on the inner rim portions thereof with retainers 135a to 138a adapted for retaining the lock ribs 51, 65, 77 and 87 of the actuating levers 31 to 34 when the actuating levers 31 to 34 are thrust.

The lever lock slider 38 is locked in the thrust state by the lock ribs 51, 65, 77 and 87 of the actuating levers 31 to 34 being retained by the retainers 135a to 138a of the lock openings 135 to 138.

The lever lock slider 38 is formed with an actuating opening 139 passed through by an actuating rib 95 of the stop actuating lever 35. When the stop actuating lever 35 is thrust, the lever lock slider 38 is moved by the actuating rib 95 of the stop actuating lever 35.

The lever lock slider 38 is integrally formed at an end thereof with an S-shaped resilient deflecting portion 141. This resilient deflecting portion 141 has its distal end abutted against an abutment rib 142 set upright on the chassis 18 to be thereby resiliently deflected for biasing the lever lock slider 38 into movement.

The lever lock slider 38 is integrally formed with an actuating portion 144 moved by an actuating portion 129 of the shut-off lever 37.

The switch slider 39 is formed of a resin material, such as plastics, to a substantially rectangular shape, as shown in FIG. 10. In the major surface of this switch slider 39 are formed guide slits 145, 145 into which are slidably inserted guide ribs 146, 146 set upright on the chassis 18. The one end of the major surface of the switch slider 39 is formed a guide slit 147 in which is slidably inserted a guide rib 148 set upright on the chassis. The switch slider 39 is slidably arranged on the chassis 18.

Although not shown, a plurality of engagement pawls are formed as one on the switch slider 39. The engagement pawls are slidably engaged in engagement slits formed in the chassis 18. A plurality of abutment ribs, also not shown, are mounted upright as one on the major surface of the switch slider 39 to assure a pre-set facing distance from the chassis 18.

Referring to FIG. 10, the major surface of the switch slider 39 is formed with an actuating opening 149 passed through by the lock rib 51 for the playback actuating lever 31, an actuating opening 150 passed through by the lock rib 87 for the rewind actuating lever 34, and an actuating opening 151 passed through by the lock rib 77 for the fast feed actuating lever 31.

Referring to FIG. 10, a motor switch 152, such as a reed switch, connected to the driving motor 20 of the reel driving unit 10, is arranged on the chassis 18. The motor switch 152 has a power source, not shown, and a pair of terminal plates 152a, 152a connected to the driving motor 20. These terminal plates 152a, 152a are provided at pre-set separation from each other.

The distal end of the terminal plate 152a carries an actuating piece 152b actuated by the switch slider 39. A switch actuating piece 153 for thrusting the terminal plate 152a of the motor switch 152 is formed as one on the lateral side of the motor switch 152 extending parallel to the sliding direction.

When the switch slider 39 is slid, the switch actuating piece 153 of the switch slider 39 compresses against the actuating piece 152b for thrusting the terminal plate 152a. The terminal plates 152a, 152a are interconnected by the thrusting of the terminal plate 152a, so that the motor switch 152 connects the power source to the driving motor 20 to cause rotation of the driving motor 20.

On the major surface of the switch slider 39 is set upright a spring mounting rib 155 fitted with a torsion spring 156. This torsion spring has its one end abutted against a metallic bearing member 55b supporting the capstan arbor 41, while having its opposite end retained by an upstanding peripheral wall section 18a of the metallic chassis 18.

Therefore, the torsion coil spring 156 biases the switch slider 39 into sliding movement, by its resiliency, while electrically connecting the capstan arbor 41 to the chassis 18 for grounding. The capstan arbor 41 is safeguarded against affecting information signals recorded on a magnetic tape by static charges generated between, for example, the flywheel 21 and the belt 26.

On one lateral side of the switch slider 39 is integrally formed a substantially U-shaped resilient deflecting portion 158 the distal end of which compresses against the operating portion 129 of the shut-off lever 37.

The torsion spring 125 is mounted on a bushing 25d of the second gear train 25 of the reel driving unit 10 so that both ends thereof face the lateral end of the oscillating actuating unit 127 of the shut-off lever 37.

[10] Operation of the Reel Driving Unit

The operation of the above-described reel driving unit 10 in rotationally driving the takeup side reel block 7 and the supply side reel block is explained with reference to FIGS. 3 and 4.

Referring to FIG. 3, the reel driving unit 10 causes rotation of the flywheel via belt 26 by the pulley 20b being rotated by the driving motor 20. The flywheel, thus rotated, rotates the cam gear 22 by the gear portion 21c.

For reproduction or recording, the cam gear 22, in rotation, meshes with the playback gear 25b of the second gear train 25 moved axially by the playback actuating lever 31. The playback gear 25b of the second gear train 25 is run in rotation by the cam gear 22 for running the takeup side reel block 7 at a pre-set rpm.

For fast feed, the cam gear 22, run in rotation, rotates the first gear 23a of the first gear train 23, while rotating the second gear 23b of the first gear train 23. The second gear 23b of the first gear train 23, thus rotated, meshes with the idler gear 24 moved axially by the fast feed actuating lever 33.

The idler gear 24 is rotated by the second gear 23b of the first gear train 23 for rotating the fast feed gear 25a of the second gear train 25. The fast feed gear 25a of the second gear train 25 runs the takeup side reel block 7 at a pre-set rpm.

For rewind, the cam gear 22, thus rotated, rotates the first gear 23a of the first gear train 23, while causing rotation of the second gear 23b of the first gear 23, as shown in FIG. 4. The second gear 23b of the first gear train 23, thus rotated, meshes with the gear portion 8b of the supply side reel block 8, moved axially by the rewind actuating lever 34, to run thereby the supply side reel block in rotation.

[11] Operation of the Reproducing Unit

Figure 11:
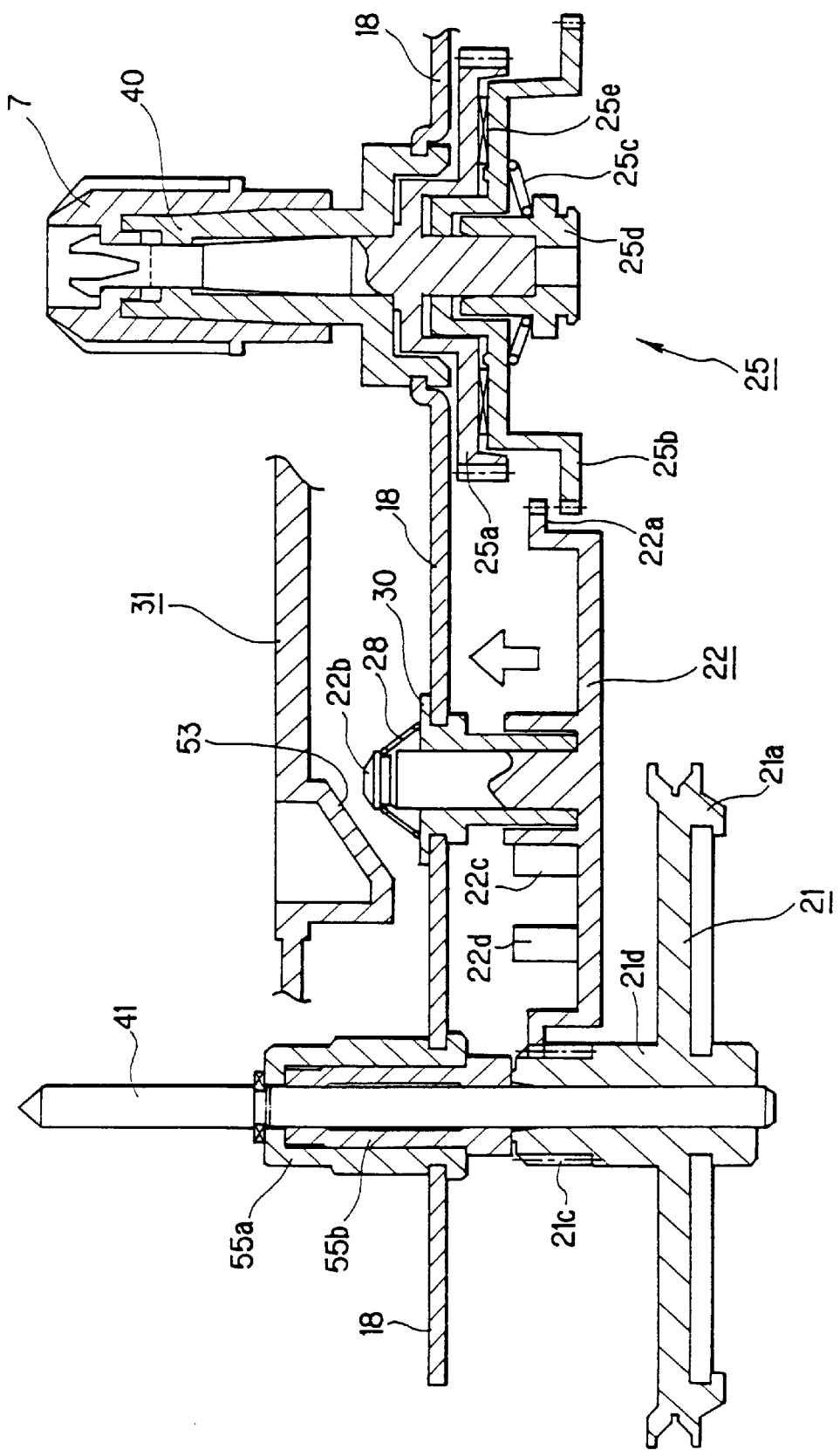
FIG. 11 is a longitudinal cross-sectional view for illustrating the operation of the playback unit.
Figure 12:
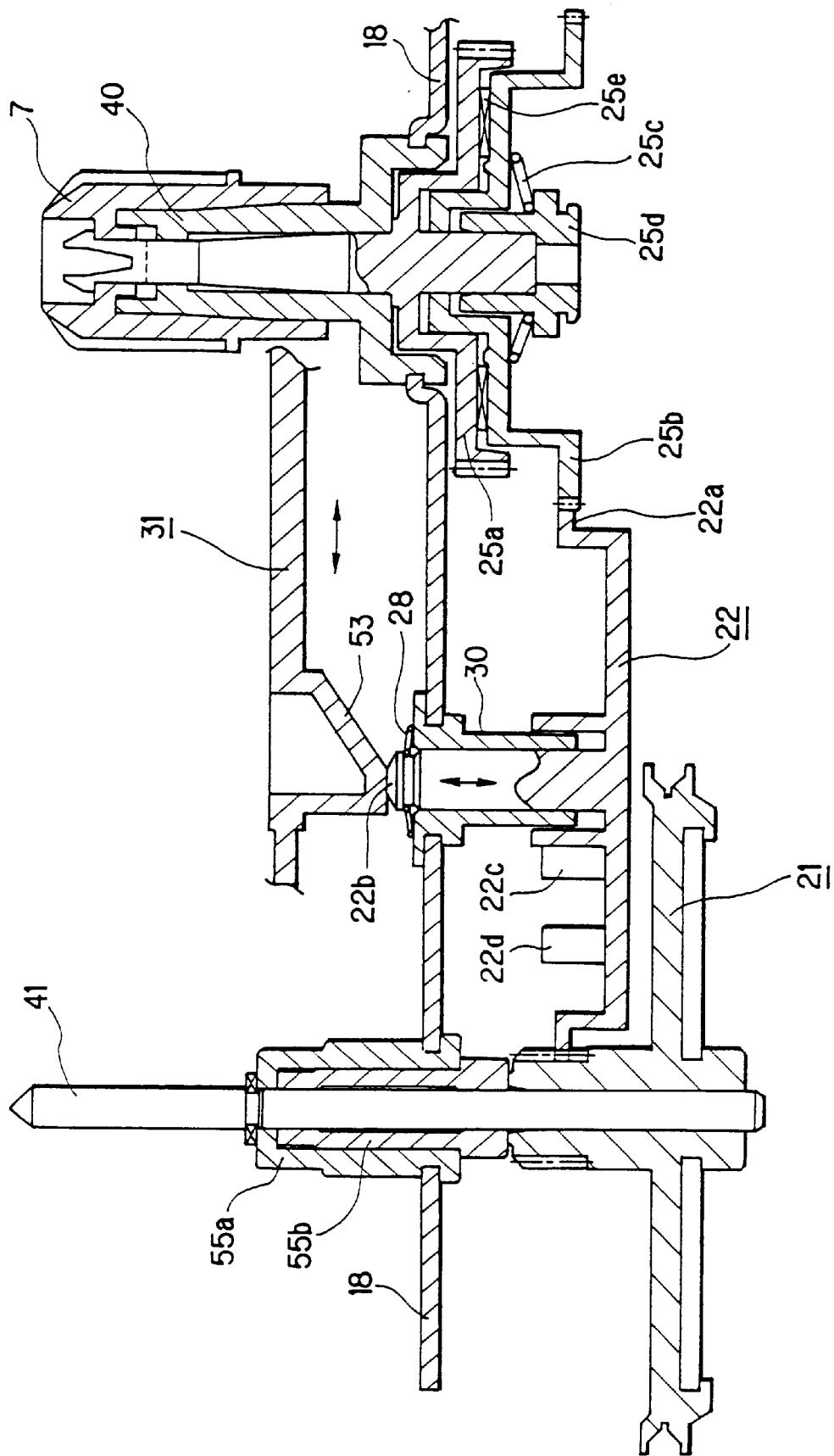
FIG. 12, similar to FIG. 11, is a longitudinal cross-sectional view for illustrating the operation of the playback unit.

The operation of the above-described playback unit 11 when the playback actuating lever 31 is thrust is explained with reference to FIGS. 6, 11 and 12.

When thrust against the bias of the torsion spring 44, the playback actuating lever 31 rotates the pinch roll unit 42 for compression against the capstan arbor 41 while simultaneously rotating the recording/reproducing head 43.

When slid, the playback actuating lever 31 has the actuating lug 53 abutted against the support shaft 22b of the cam gear 22 of the reel driving unit 10 for axially sliding the cam gear 22 against the bias of the coil spring 28. The cam gear 22, thus slid, has the gear portion 22a engaged with the playback gear portion 25b of the second gear train 25. Since the lock rib 51 is moved by the movement of the playback actuating lever 31, the lever lock slider 38 is moved against the bias of the resilient deflecting portion 142. By the lock rib 51 being retained by the retention portion 135a, the playback lever 31 is moved at the thrust position. Simultaneously, the holder 42b is rotated to rotate the pinch roll 42a along with the capstan arbor 41 in a direction of clamping the magnetic tape.

When the stop lever 35 is thrust to move the lock slider 38 such that the playback actuating lever 31 is reset to the initial position under the resiliency of the torsion coil spring 44, the playback actuating lever 31 runs the pinch roll unit 42 in rotation to separate the pinch roll unit 42 away from the capstan arbor 41.

[12] Operation of the Recording Unit

The operation of the above-described recording unit 12 when the recording actuating lever 323 is thrust is explained with reference to FIGS. 6, 11 and 12.

By being thrust against the bias of the torsion spring 44, the recording actuating lever 32 causes the playback actuating lever 31 to be slid via actuating piece 52 of the playback actuating lever 31 for causing sliding of the playback actuating lever 3 1 in unison. The recording lever 32 is locked at the position thrust by the lever lock slider 38 as when the playback actuating lever 31 is thrust.

By the recording actuating lever 32 being thrust, the erasure magnetic head 60 is advanced in the same way as the playback head 43, while the magnetic tape is run in the same way as when the playback actuating lever 31 is thrust, so that, after erasure of the information signals by the erasure head 60, the information signals are recorded by the recording/reproducing head 43.

[13] Operation of the Fast Feed Unit

Figure 13:
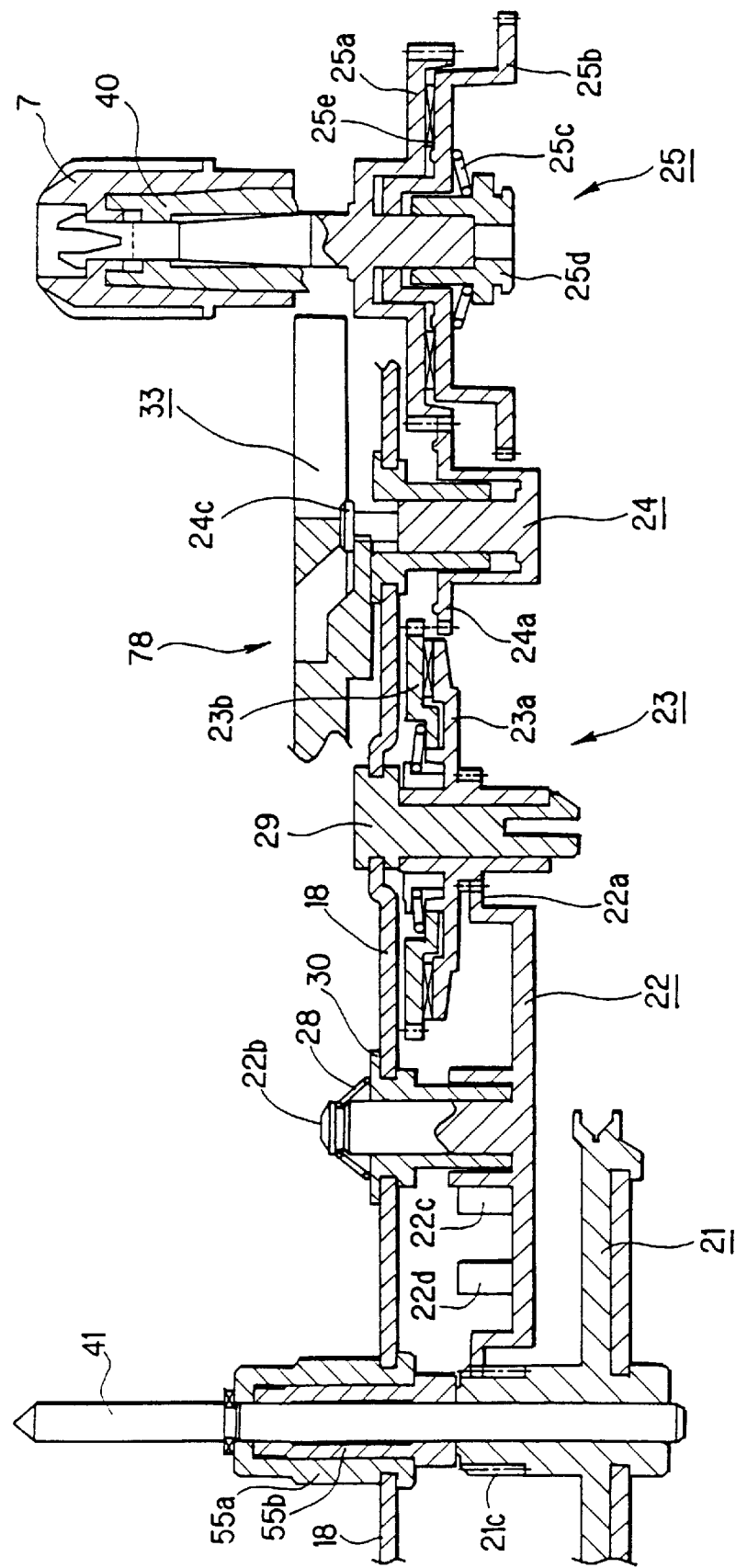
FIG. 13 is a longitudinal cross-sectional view for illustrating the operation of the fast feed unit.
Figure 14:
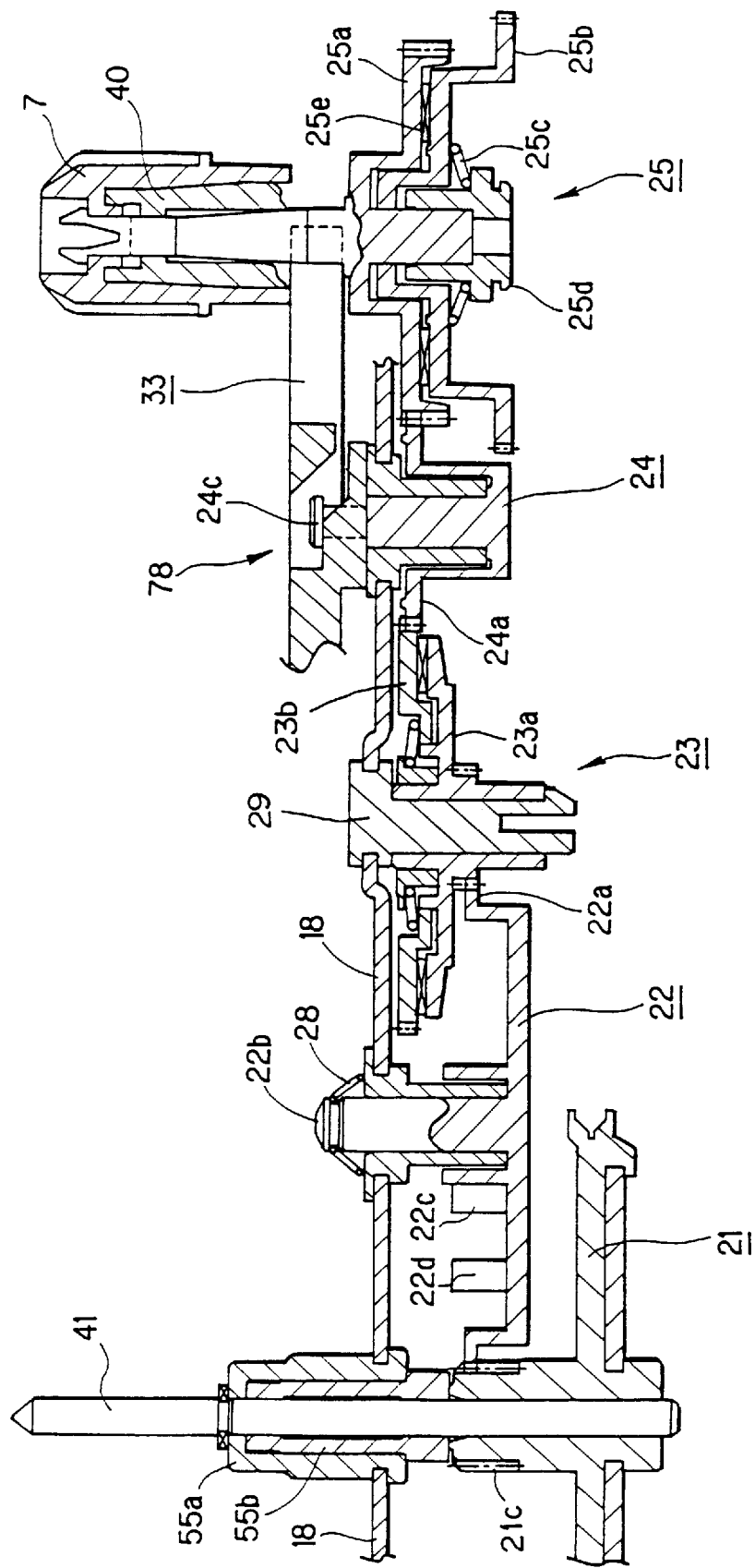
FIG. 14, similar to FIG. 13, is a longitudinal cross-sectional view for illustrating the operation of the fast feed unit.

The operation of the above-described fast feed unit 13 when the fast feed actuating lever 33 is thrust is explained with reference to FIGS. 13 and 14.

When the fast feed lever 33 is thrust against the bias of the torsion spring 70, the gear actuating unit 78 compresses against the movement gear 24c of the idler gear 24 of the reel driving unit 10 to slide the idler gear 24 in the axial direction. When thrust, the fast feed lever 33 is locked at a position thrust by the lever lock slider 38, as when the playback actuating lever 31 is thrust.

The idler gear 24, thus slid, meshes with the second gear 23b of the first gear train 23 to enable rotation of the fast feed gear 25a of the second gear train 25 by the first gear train 23. Based on the driving power transmitted from the driving motor 20, the idler gear 24 causes rotation of the first gear train 23b of the first gear train 23 and the fast feed gear 25a of the second gear unit 25 to run the takeup side reel block 7 in rotation.

[14] Operation of the Rewind Unit

Figure 15:
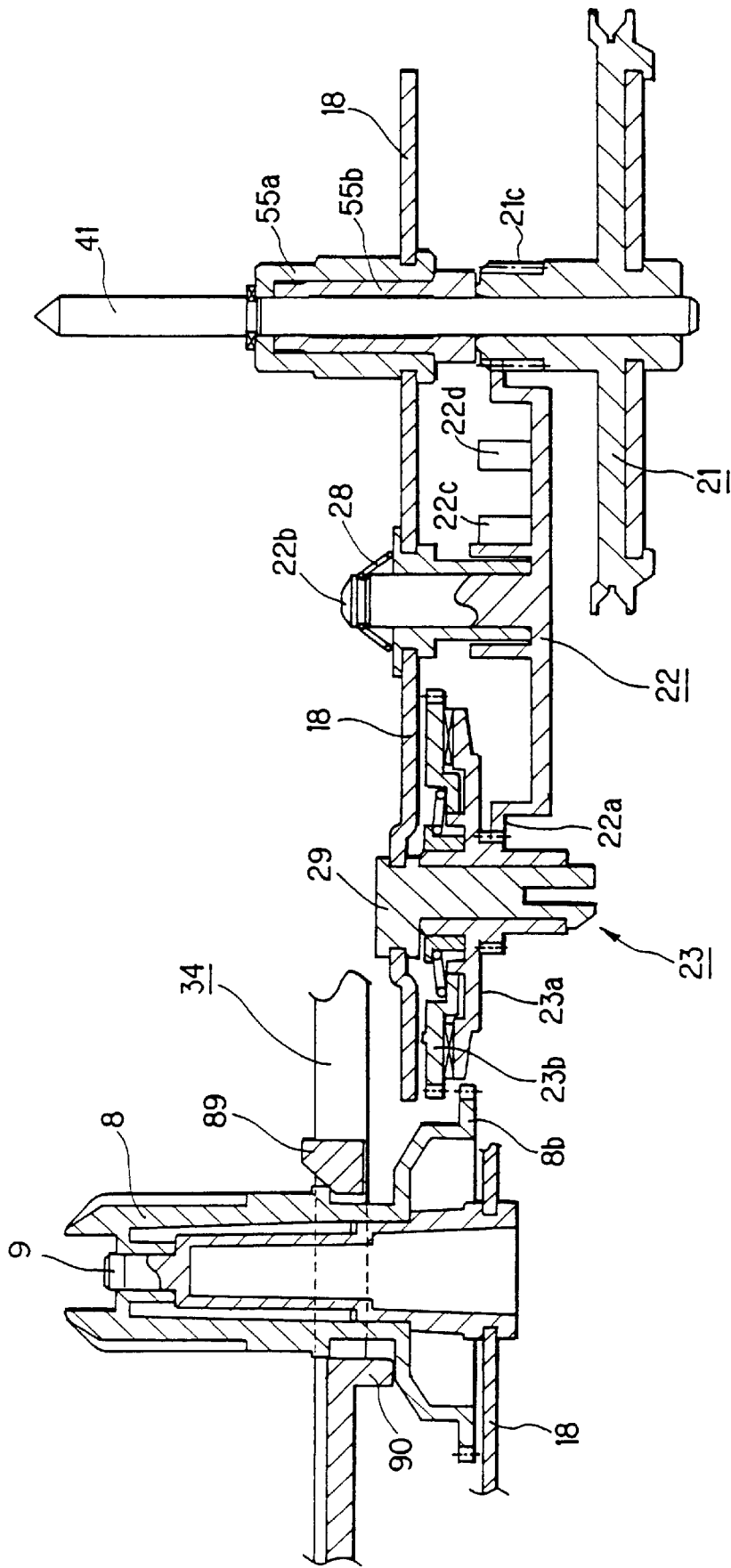
FIG. 15 is a longitudinal cross-sectional view for illustrating the operation of the rewind unit.
Figure 16:
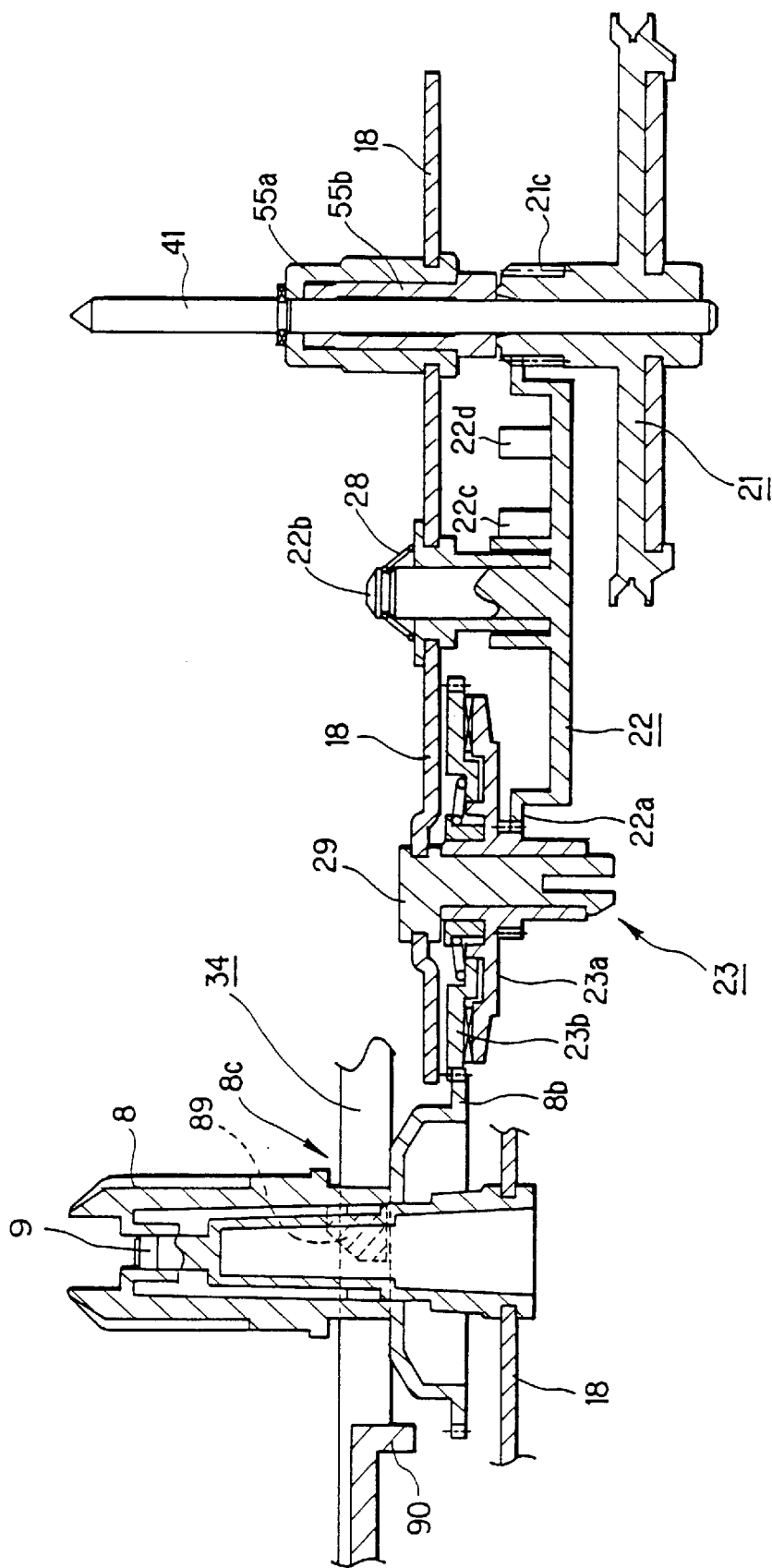
FIG. 16, similar to FIG. 15, is a longitudinal cross-sectional view for illustrating the operation of the rewind unit.

The operation of the above-described rewind unit 14 when the rewind actuating lever 34 is thrust is explained with reference to FIGS. 15 and 16.

When the rewind actuating lever 34 is thrust against the bias of the torsion spring 70, the reel actuating pawl 89 is engaged with the actuating portion 8c of the supply side reel block 8 to slide the supply side reel block 8 in the axial direction. When the supply side reel block 8 is slid, the gear portion 8b meshes with the second gear 23b of the first gear train 23 and is thereby enabled for rotation. When the rewind actuating lever 34 is thrust, it is locked by the lever lock slider 38 at the thrust position, as in the case of the playback actuating lever 31 described above. Based on the driving power from the driving motor 20, the cam gear 22, first gear 23a and the second gear 23b are rotated to rotate the supply side reel block 8.

When the rewind actuating lever 34 is reset to its initial position, by the thrusting of the stop actuating lever 35 and movement of the lock slider 38, the rewind actuating lever 34 disengages the actuating portion 8c of the supply side reel block 8 from the reel actuating pawl 89, at the same time as the reel actuating piece 90 is engaged with the actuating portion 8c of the supply side reel block 8 to move the supply side reel block 8 in the axial direction to its initial position.

[15] Operation of the Stop Unit

The operation of the above-described stop unit 15 when the actuating levers 31 to 34 are thrust and the stop actuating lever 35 is then thrust, is explained with reference to FIGS. 5 and 10.

When the actuating levers 31 to 34 are thrust and the stop actuating lever 35 is then thrust against the bias of the torsion spring 91, the stop actuating lever 35 causes the lever lock slider 38 of the automatic stop unit 17 to be moved via the actuating rib 95.

When the lever lock slider 38 is moved, it disengages the retention portions 135a to 138a of the lock openings 135 to 138 from the lock ribs 51, 65, 77 and 87 of the actuating levers 31 to 34 to reset the thrust actuating levers 31 to 34 to the initial positions.

[16] Operation of the Pause Unit

The operation of the above-described pause unit 15 when the actuating levers 31 to 34 are thrust and the pause actuating lever 36 is then thrust, is explained with reference to FIG. 8.

If, during the playback operation or recording operation when the playback actuating lever 31 or the recording actuating lever 32 is thrust, the pause actuating lever 36 is thrust, the actuating rib 106 of the pause actuating lever 36 compresses against the oscillation actuating arm 42d of the holder 42b constituting the pinch roll unit 42 pressed against the capstan arbor 41 with the magnetic tape in-between.

With the actuating rib 106 compressing against the oscillation actuating arm 42d of the holder 42b, the pause actuating lever 36 moves the oscillation actuating arm 42d to rotate the pinch roll unit 42 in a direction away from the capstan arbor 41.

If thrust during the playback operation or during recording operation, the pause actuating lever 36 is slid to cause the actuating lug 107 to abut on and move one end of the torsion spring 116.

The torsion spring 116, the one end of which has been moved, causes the reel lock slider 38 to slide to engage the lock pawl 113a of the lock piece 113 to be engaged with the fast feed gear 25a of the second gear train 25. Thus the reel lock slider 98 transiently halts the rotational driving of the takeup side reel block 7.

If, during the fast feed operation when the fast feed actuating lever 33 has been thrust, the pause actuating lever 36 is thrust, the actuating lug 107 compresses against and shifts one end of the torsion spring 116. Thus, the torsion spring 116 biases the reel lock slider 98 into sliding movement.

However, sliding movement of the reel lock slider 98 is disabled because the first abutting wall section 122 of the abutment portion 121 compresses against the one lateral end of the thrust fast feed lever 33. Therefore, the rotation of the takeup side reel block 7 is not halted by the reel lock slider 98 because the lock pawl 113a of the lock piece 113 is not engaged with the fast feed gear 25a. That is, the pause actuating lever 36, thrust during the fast feed operation, does not stop rotational driving of the takeup side reel block 7.

If, during the rewind operation when the rewind actuating lever 34 is thrust, the pause actuating lever 36 is thrust, the actuating lug 107 compresses against one end of the torsion spring 116 to move this one end. Thus the torsion spring 116 biases the reel lock slider 98 into movement.

However, sliding movement of the reel lock slider 98 is disabled because the second abutting wall section 123 of the abutment portion 121 compresses against the regulating lug 88 of the thrust rewind actuating lever 33. Therefore, the rotation of the takeup side reel block 7 is not halted by the reel lock slider 98 because the lock pawl 113a of the lock piece 113 is not engaged with the fast feed gear 25a. The pause actuating lever 36, thrust during the rewind operation, does not stop rotational driving of the takeup side reel block 7.

If the fast feed actuating lever 33 or the rewind actuating lever 34 is thrust after thrusting the pause actuating lever, the lateral end of the fast feed actuating lever 33 or the regulating lug 88 of the rewind actuating lever 34 compresses against the first abutting wall section 122 or the second abutting wall section 123 of the abutting portion 121, thus sliding the reel lock slider 98 to a position not obstructing the fast feed operation or the rewind operation.

[17] Operation of the Automatic Stop Unit

Figure 17:
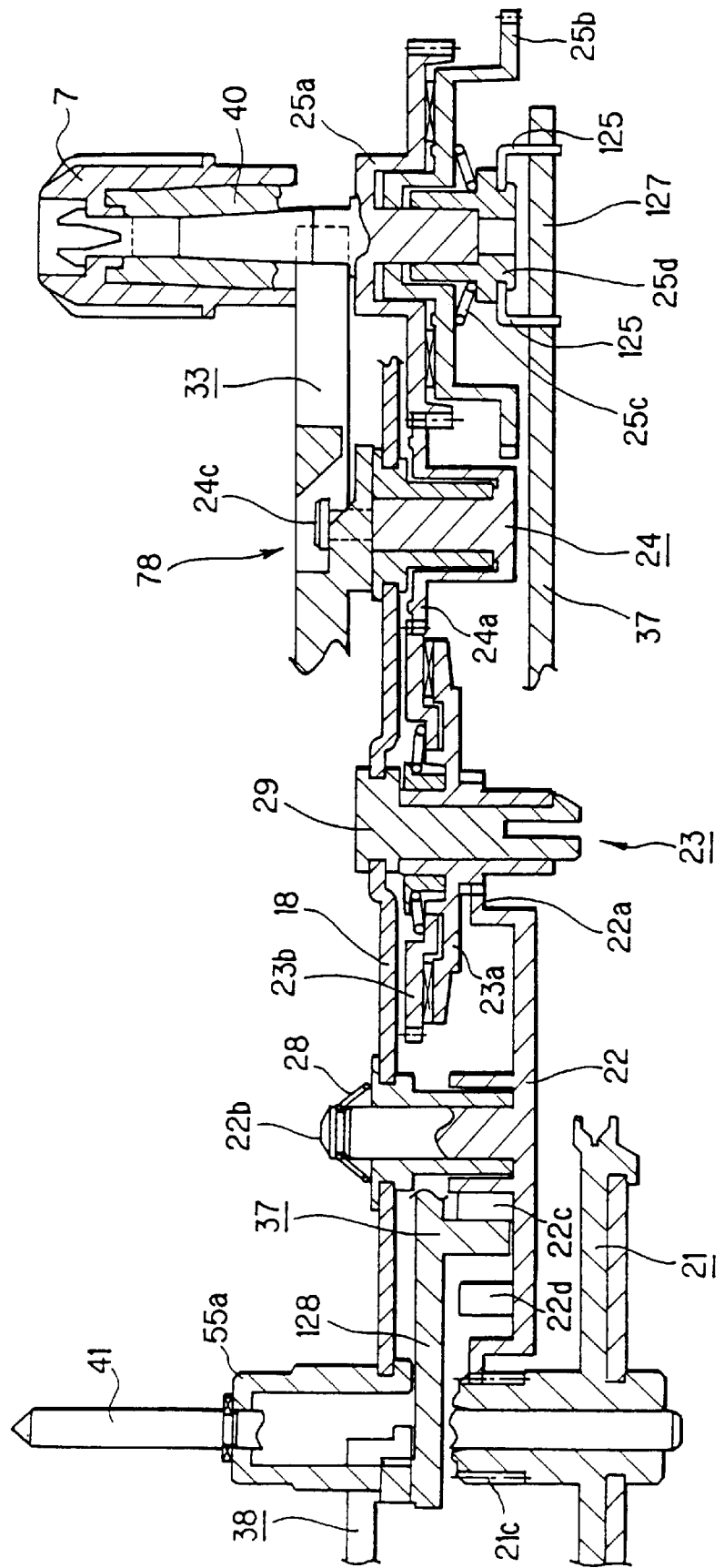
FIG. 17 is a longitudinal cross-sectional view for illustrating the operation of the automatic stop unit.

The operation of the above-described automatic stop unit 17 when the actuating levers 31 to 34 are automatically reset for automatically halting the driving of the reel driving unit 10 is explained with reference to FIGS. 9, 10 and 17.

It is assumed that the takeup of the magnetic tape of the tape cassette is terminated when the playback actuating lever 31 or the recording actuating lever 32 is thrust.

When the magnetic tape is being taken up, the first gear 23a of the first gear train continues to be rotated along with the flywheel 21 and the cam gear 22. When the playback actuating lever 31 or the recording actuating lever 23 is thrust, the cam gear 22 is slid in the axial direction during the fast feed operation or during the rewind operation. However, the cam gear 22 continues to be engaged with the cam arm 128 of the shut-off lever 37.

Since the bushing 25d is rotated in the magnetic tape rewind direction, the torsion spring 125 mounted on this bushing 25d is rotated. The torsion coil spring 125, thus rotated, has its one end abutted against the oscillation actuating portion 127 of the shut-off lever 37 to generate the rotational torque. Since the cam gear 22 is run in rotation, the cam arm 128 of the shut-off lever 37 is oscillated along the outer rim of the cam portion 22c of the cam gear 22.

With the automatic stop unit 17, rotation of the bushing 25d is stopped with halting of the takeup side reel block 7 when the rewind operation of the magnetic tape of the tape cassette comes to a close, and then the rotation of the bushing 25d ceases.

The rotational torque afforded to the shut-off lever 37 from the torsion spring 125 ceases on cessation of the rotation of the torsion spring 125. Thus, the oscillation of the shut-off lever 37 ceases when the cam arm 128 is moved to the maximum enlarged point of the cam portion 22c of the cam gear 22.

Since the cam gear 22 is rotated, the engagement lug 22d of the cam gear 22 is engaged in the engagement groove 128a of the cam arm 128 of the shut-off lever 37 at a standstill, after ¾ rotation of the engagement lug 22d of the cam gear 22. This engagement lug 22d causes oscillation of the shut-off lever 37.

Since the actuating portion 129 is engaged with the actuating portion 144 of the lever lock slider 38, the shut-off lever 37, oscillated by the cam portion 22c of the cam gear 22, slides the lever lock slider 38 an amount corresponding to the lever rotation about the oscillation support shaft 126 as the center of oscillation.

The lever lock slider 38, thus slid, unlocks the thrust playback actuating lever 31 or the recording actuating lever 32 to reset the levers to the initial positions via the retainer 136a of the lock opening 136 retaining the lock groove 51 of the playback actuating lever 31 or via retainer 135a of the lock opening 135 retaining the lock groove 65 of the recording actuating lever 32.

When the lever lock slider 38 is slid, the actuating portion 129 of the shut-off lever 37 thrusts the resilient deflecting portion 158 to reset the switch slider 39 to its initial position. When the switch slider 39 is slid to its initial position, the switch operating piece 153 thrusting the terminal plate 152a of the motor switch 152 is moved to interrupt the connection of the paired terminal plates 152a, 152a of the motor switch 152. Since the rotational driving of the driving motor 20 now ceases, the driving operation of the reel driving unit 10 ceases.

The operation of the automatic stop unit 17 when the magnetic tape rewind operation ceases on thrusting the fast feed actuating lever 33 is explained.

During takeup of the magnetic tape, the first gear 23a of the first gear train continues to be rotated along with the flywheel 21 and the cam gear 22. The shut-off lever 37 has the cam arm portion 128 engaged with the cam gear 22.

Thus, if the fast feed actuating lever 33 is thrust, the shut-off lever 37 is oscillated in the same manner as when the playback actuating lever 31 or the recording actuating lever 32 is thrust, so that the automatic stop unit 17 resets the thrust fast feed actuating lever 33 to its initial position to effect an automatic stop operation. Therefore, detailed description is omitted for simplicity.

The operation of the automatic stop unit 17 when the magnetic tape takeup operation ceases during the time the rewind actuating lever 34 is thrust to take up the magnetic tape of the tape cassette is explained.

During magnetic tape takeup, the first gear 23a of the first gear train continues to be rotated along with the flywheel 21 and the cam gear 22. The shutoff lever 37 has the cam arm portion 128 engaged with the cam gear 22.

With the automatic stop unit 17, the direction of rotation of the torsion spring 125 is opposite to the direction of rotation during the fast feed. However, the direction in which one end of the torsion spring 125 biases the oscillation actuating portion 127 is the same as the direction during the fast feed operation.

Thus, if the rewind actuating lever 33 is thrust, the shut-off lever 37 is oscillated in the same manner as when the playback actuating lever 31 or the recording actuating lever 32 is thrust, so that the automatic stop unit 17 resets the thrust rewind actuating lever 34 to its initial position to effect an automatic stop operation. Therefore, detailed description is omitted for simplicity.

The operation of the automatic stop unit 17 in preventing mistaken operation during stop or pause is explained.

During the stop state of the tape recorder 1 when the actuating levers 31 to 34 are not actuated, the terminal plates 152a, 152a of the motor switch 152 are not connected to each other, so that the driving motor 20 is not run in rotation. Therefore, rotation of the flywheel 21 or the cam gear 22 of the reel driving unit 10 ceases.

However, if, in the tape recorder 1, the motor switch 152 is provided independently of a main switch not shown, and the main switch is turned on, the driving motor 20 is run in rotation even if the motor switch 152 is turned off. Since the cam gear 22 is run in rotation by the driving motor 20 at this time, the automatic stop operation by the shut-off lever 37 is turned on each time the cam gear completes its full rotation, thus raising an inconvenience. That is, the shut-off lever 37 slides the lever lock slider 38 so that the operating portion 129 of the shut-off lever 37 compresses against the operating portion 144 of the lever lock slider 38 to produce a noise continuously.

However, with the tape recorder 1 embodying the present invention, since the resilient deflective portion 158 of the switch slider 39 biases the shut-off lever 37, the switch slider 39 is moved to a position not interfering with the shut-off lever 37, so that, with the automatic stop unit 17, the resilient deflective portion 158 of the switch slider 39 is effective to reliably prevent mistaken operation from occurring during the stop time of the tape recorder 1.

With the automatic stop unit 17, the actuating arm 110 formed on the pause actuating lever 36 embraces the actuating rib 130 of the shut-off lever 37 to actuate the shut-off lever 37. That is, the oscillation of the shut-off ever 37 is regulated by the actuating arm 110 of the pause actuating lever 36.

Therefore, with the automatic stop unit 17, rotation of the takeup side reel block 7 is transiently stopped on thrusting the pause actuating lever 36 to stop the rotation of the takeup side tape reel, thus reliably prohibiting an oscillating movement of the shut-off lever 37. That is, the automatic stop unit 17 is effective to prevent mistaken operation during pause.

Although the foregoing description has been made on a tape recorder employing a tape cassette having a pair of tape reels, recording/reproduction of video signals may be adapted to recording/reproduction of other types of information signals.

What is claimed is:

1. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion, to said takeup side reel block gear portion and to said capstan arbor, said intermediate gear being movably mounted for movement along an axis of rotation thereof and including a playback gear and a fast feed gear which rotate independently of each other; and a switching unit for switching a running state of the magnetic tape, said switching unit having at least one actuating member, said switching unit switching the running state of the magnetic tape by said actuating member being thrust from an initial position, said at least one actuating member including a playback actuating member and a fast feed actuating member, wherein said playback actuating member is thrust to shift said playback gear along an axis of rotation of said playback gear to supply the driving power of said driving source to said takeup side reel block gear portion and said fast feed actuating member is thrust to shift said fast feed gear along an axis of rotation of said fast feed gear to supply the driving power of said driving source to said takeup side reel block gear portion.

2. The recording/reproducing apparatus for a magnetic tape as claimed in claim 1 wherein said switching unit includes a rewind actuating member for switching the magnetic tape to a rewind state.

3. The recording/reproducing apparatus for a magnetic tape as claimed in claim 2 further comprising:

a pinch roll unit for clamping the magnetic tape in cooperation with said capstan arbor to run the magnetic tape, said playback actuating member having an actuating portion for shifting said pinch roll unit to a position of clamping the magnetic tape with said capstan arbor.

4. The recording/reproducing apparatus for a magnetic tape as claimed in claim 3 wherein said playback actuating member further includes a head mounting portion having a magnetic head for recording information signals on the magnetic tape or reading out recorded information signals from the magnetic tape.

5. The recording/reproducing apparatus for a magnetic tape as claimed in claim 2 wherein said switching unit includes a first biasing member for shifting said playback gear along the axis of rotation of said playback gear when said playback actuating member is reset to the initial position thereof, and a second biasing member for shifting said fast feed gear along the axis of rotation of said fast feed gear when said fast feed actuating member is reset to the initial position thereof.

6. The recording/reproducing apparatus for a magnetic tape as claimed in claim 1 further comprising:

a lock unit for locking said actuating member at a position thrust from said initial position and an unlock unit for unlocking said actuating member at a terminal end of the magnetic tape.

7. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion, to said takeup side reel block gear portion and to said capstan arbor, said intermediate gear being movably mounted for movement along an axis of rotation thereof; and a switching unit for switching a running state of the magnetic tape, said switching unit having at least one actuating member, said switching unit switching the running state of the magnetic tape by said actuating member being thrust from an initial position, and said switching unit including a playback actuating member for shifting said intermediate gear along the axis of rotation to switch to a playback state of the magnetic tape when said playback actuating member is thrust from an initial position thereof, a fast feed actuating member for switching the magnetic tape to a fast feed state, a rewind actuating member for switching the magnetic tape to a rewind state, and a further intermediate gear moved along the axis of rotation by thrusting said fast feed actuating member from an initial position thereof to transmit the driving power from said driving source to said takeup side reel block gear portion and to said capstan arbor, wherein said actuating member is thrust to shift said intermediate gear along the axis of rotation to supply the driving power of said driving source to said supply side reel block gear portion or said takeup side reel block gear portion, and said supply side reel block gear portion moves along the axis of rotation of said supply side reel block, the driving power of said driving source being transmitted by thrusting said rewind actuating member from an initial position thereof to shift said supply side reel block gear portion along the axis of rotation.

8. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion, to said takeup side reel block gear portion and to said capstan arbor, said intermediate gear being movably mounted for movement along an axis of rotation thereof; and a switching unit for switching a running state of the magnetic tape, said switching unit having at least one actuating member, said switching unit switching the running state of the magnetic tape by said actuating member being thrust from an initial position, and said switching unit including a recording actuating member for switching to a recording state of the magnetic tape when said recording actuating member is thrust from an initial position thereof, a playback actuating member for shifting said intermediate gear along the axis of rotation to switch to a playback state of the magnetic tape when said playback actuating member is thrust from an initial position thereof, a fast feed actuating member for switching the magnetic tape to a fast feed state, a rewind actuating member for switching the magnetic tape to a rewind state, and a further intermediate gear moved along the axis of rotation by thrusting said fast feed actuating member from an initial position thereof to transmit the driving power from said driving source to said takeup side reel block gear portion and to said capstan arbor, wherein said actuating member is thrust to shift said intermediate gear along the axis of rotation to supply the driving power of said driving source to said supply side reel block gear portion or said takeup side reel block gear portion, and said recording actuating member has an actuating portion for shifting said playback actuating member when said recording actuating member is thrust.

9. The recording/reproducing apparatus for a magnetic tape as claimed in claim 8 wherein said playback actuating member includes a further actuating portion for actuating said actuating portion to reset said recording actuating member to the initial position of said recording actuating member when said playback actuating member is reset to the initial position thereof.

10. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion, to said takeup side reel block gear portion and to said capstan arbor, said intermediate gear being movably mounted for movement along an axis of rotation thereof; and a switching unit for switching a running state of the magnetic tape, said switching unit having at least one actuating member, said switching unit switching the running state of the magnetic tape by said actuating member being thrust from an initial position; and a lock unit for locking said actuating member at a position thrust from said initial position and an unlock unit for unlocking said actuating member at a terminal end of the magnetic tape, wherein said actuating member is thrust to shift said intermediate gear along the axis of rotation to supply the driving power of said driving source to said supply side reel block gear portion or said takeup side reel block gear portion, said intermediate gear has a cam portion and an engagement portion, and said unlock unit includes a rotatable member rotated in unison with said takeup side reel block, a first arm section compressing against said cam portion and engaged with said engagement portion, and a second arm section oscillated by said rotatable member and a third arm section moving said lock unit in a direction of unlocking said actuating member, rotation of said rotatable member being stopped with cessation of rotation of said takeup side reel block to engage said engagement portion of said intermediate gear with said first arm section to rotate said rotatable unlock member, and, when rotated, said unlock member moving said lock unit in a direction of unlocking said actuating member.

11. The recording/reproducing apparatus for a magnetic tape as claimed in claim 10 further comprising:

a movement member moved when said lock unit is moved in a direction of unlocking said actuating member; and a switch actuated by said movement member for switching a power source supply state to said driving source.

12. The recording/reproducing apparatus for a magnetic tape as claimed in claim 11 wherein said movement member has an actuating portion moved by said rotatable unlock member.

13. The recording/reproducing apparatus for a magnetic tape as claimed in claim 11 wherein said switching unit includes a pause actuating member for switching to a running pause state of the magnetic tape when said pause actuating member is thrust from an initial position thereof, said pause actuating member including a regulating portion for regulating rotation of said unlock member.

14. The recording/reproducing apparatus for a magnetic tape as claimed in claim 13 further comprising:

a reel lock member for stopping rotation of said takeup side reel block when said reel lock member is engaged with said takeup side reel block gear portion;

said pause actuating member being thrust from the initial position thereof to engage said reel lock member with said takeup side reel block gear portion to switch to a running pause state of the magnetic tape.

15. A recording/reproducing apparatus for a magnetic tape placed on a pair of tape reels, comprising:

a supply side reel block engaged with a supply side one of the pair of tape reels said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a reel lock member for stopping rotation of said takeup side reel block when said reel lock member is engaged with said takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion, to said takeup side reel block gear portion and to said capstan arbor, said intermediate gear being movably mounted for movement along an axis of rotation thereof; and a switching unit for switching a running state of the magnetic tape, said switching unit having at least one actuating member, said switching unit switching the running state of the magnetic tape by said actuating member being thrust from an initial position, and said switching unit including a pause actuating member for engaging said reel lock member with said takeup side reel block gear portion to switch to a pause state of the magnetic tape when said pause actuating member is thrust from an initial position thereof, a playback actuating member for shifting said intermediate gear along the axis of rotation to switch to a playback state of the magnetic tape when said playback actuating member is thrust from an initial position thereof, a fast feed actuating member for switching the magnetic tape to a fast feed state, a rewind actuating member for switching the magnetic tape to a rewind state, and a further intermediate gear moved along the axis of rotation by thrusting said fast feed actuating member from an initial position thereof to transmit the driving power from said driving source to said takeup side reel block gear portion and to said capstan arbor, wherein said actuating member is thrust to shift said intermediate gear along the axis of rotation to supply the driving power of said driving source to said supply side reel block gear portion or said takeup side reel block gear portion.

16. The recording/reproducing apparatus for a magnetic tape as claimed in claim 15 wherein said switching unit includes a holding unit for holding said pause actuating member in a thrust position when said pause actuating member is thrust from the initial position thereof.

17. The recording/reproducing apparatus for a magnetic tape as claimed in claim 15 wherein said reel lock member includes an abutting portion for compressing against said fast feed actuating member and/or said rewind actuating member thrust from said initial position, said reel lock member being regulated in its movement by abutment of said fast feed actuating member and/or said rewind actuating member thrust from the initial position thereof against said abutting portion.

18. The recording/reproducing apparatus for a magnetic tape as claimed in claim 15 further comprising:

a pinch roll unit for clamping the magnetic tape in cooperation with said capstan arbor for running the magnetic tape, said pause actuating member having a movement actuating member for moving said pinch roll unit in a direction away from said capstan arbor.

19. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion, to said takeup side reel block gear portion and to said capstan arbor, said intermediate gear being movably mounted for movement along an axis of rotation thereof; and a switching unit for switching a running state of the magnetic tape, said switching unit having at least one actuating member, said switching unit switching the running state of the magnetic tape by said actuating member being thrust from an initial position;

a first bearing portion of a metallic material for rotatably supporting said capstan arbor;

a second bearing portion of a resin material for supporting said first bearing portion;

a chassis of a metallic material for carrying said second bearing portion; and a resilient member having one end abutted against said first bearing portion and the other end abutted against said chassis, wherein said actuating member is thrust to shift said intermediate gear along the axis of rotation to supply the driving power of said driving source to said supply side reel block gear portion or said takeup side reel block gear portion.

20. The recording/reproducing apparatus for a magnetic tape as claimed in claim 19 further comprising:

a member moved by said actuating member under a bias of said resilient member.

21. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion and to said takeup side reel block gear portion, said intermediate gear including a playback gear and a fast feed gear which rotate independently of each other;

a switching unit for switching a running state of the magnetic tape, said switching unit having at least one actuating member, said switching unit switching the running state of the magnetic tape by said actuating member being thrust from an initial position, said at least one actuating member including a playback actuating member and a fast feed actuating member;

a lock unit for locking said actuating member at a position thrust from said initial position; and an unlock unit for canceling a locked state of said actuating member at a terminal end of the magnetic tape, wherein said playback actuating member is thrust to shift said playback gear along an axis of rotation of said playback gear to supply the driving power of said driving source to said takeup side reel block gear portion without going through said fast feed gear, and said fast feed actuating member is thrust to shift said fast feed gear along an axis of rotation of said fast feed gear to supply the driving power of said driving source to said takeup side reel block gear portion without going through said playback gear.

22. The recording/reproducing apparatus for a magnetic tape as claimed in claim 21 further comprising:

a capstan arbor for running the magnetic tape, said intermediate gear selectively supplying a driving power of said driving source to said supply side reel block gear portion, to said takeup side reel block gear portion and to said capstan arbor.

23. A recording/reproducing apparatus for a magnetic tape placed on a pair of tare reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion, a switching unit for switching a running state of the magnetic tape, said switching unit having at least one actuating member, said switching unit switching the running state of the magnetic tape by said actuating member being thrust from an initial position, and said driving unit having a driving source and an intermediate gear for selectively supplying a driving power of said driving source to said supply side reel block gear portion, to said takeup side reel block gear portion and to said capstan arbor, said intermediate gear having a cam portion and an engagement portion, and being movably mounted for movement along an axis of rotation thereof;

a lock unit for locking said actuating member at a position thrust from said initial position; and an unlock unit for canceling a locked state of said actuating member at a terminal end of the magnetic tape, said unlock unit including a rotatable member rotated in unison with said takeup side reel block, a first arm section compressing against the cam portion and engaged with said engagement portion, a second arm section oscillated by said rotatable member, and a third arm section moving said lock unit in a direction of unlocking said actuating member, wherein rotation of said rotatable member stops with cessation of rotation of said takeup side reel block to cause said engagement portion of said intermediate gear with said first arm section to rotate said rotatable unlock member, and when rotated, said unlock member moves said lock unit in a direction of unlocking said actuating member.

24. The recording/reproducing apparatus for a magnetic tape as claimed in claim 23 further comprising:

a movement member for moving when said lock unit is moved in a direction of unlocking said actuating member; and a switch actuated by said movement member for switching a power source supply state to said driving source.

25. The recording/reproducing apparatus for a magnetic tape as claimed in claim 24 wherein said movement member has an actuating portion moved by said unlock member.

26. The recording/reporting apparatus for a magnetic tape as claimed in claim 24 wherein said switching unit includes a pause actuating member for switching to a running pause state of the magnetic tape when said pause actuating member is thrust from an initial position thereof, said pause actuating member including a regulating portion for regulating rotation of said unlock member.

27. The recording/reproducing apparatus for a magnetic tape as claimed in claim 26 further comprising:

a reel lock member for stopping rotation of said takeup side reel block when said reel lock member is engaged with said takeup side reel block gear portion;

said pause actuating member being thrust from the initial position thereof to engage said reel lock member with said takeup side reel block gear portion to switch to a running pause state of the magnetic tape.

28. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a driving unit meshing with said supply side reel block gear portion and said takeup side reel block gear portion for selectively rotationally driving said supply side reel block gear portion and said takeup side reel block gear portion, said driving unit having a driving source and an intermediate gear for selectively supplying a driving power of said driving source to said supply side reel block gear portion and to said takeup side reel block gear portion, said intermediate gear including a playback gear and a fast feed gear which rotate independently of each other;

a reel lock member adapted for stopping rotation of said takeup side reel block when said reel lock member is engaged with said takeup side reel block gear portion; and a switching unit for switching a running state of the magnetic tape, said switching unit having at least a pause actuating member for engaging said reel lock member with said takeup side reel block gear portion to switch to a running pause state of the magnetic tape when said pause actuating member is thrust from an initial state thereof, a playback actuating member and a fast feed actuating member, wherein said playback actuating member is thrust to shift said playback gear along an axis of rotation of said playback gear to supply the driving power of said driving source to said takeup side reel block gear portion without going through said fast feed gear, and said fast feed actuating member is thrust to shift said fast feed gear along an axis of rotation of said fast feed gear to supply the driving power of said driving source to said takeup side reel block gear portion without going through said playback gear.

29. The recording/reproducing apparatus for a magnetic tape as claimed in claim 28 wherein said switching unit includes a holding unit for holding said pause actuating member in a thrust position when said pause actuating member is thrust from the initial position thereof.

30. The recording/reproducing apparatus for a magnetic tape as claimed in claim 28 further comprising:

a capstan arbor for running the magnetic tape; and a pinch roll unit for clamping the magnetic tape in cooperation with said capstan arbor for running the magnetic tape, said pause actuating member having a movement actuating member for moving said pinch roll unit in a direction away from said capstan arbor.

31. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a driving unit meshing with said supply side reel block gear portion and said takeup side reel block gear portion for selectively rotationally driving said supply side reel block gear portion and said takeup side reel block gear portion;

a reel lock member adapted for stopping rotation of said takeup side reel block when said reel lock member is engaged with said takeup side reel block gear portion; and a switching unit for switching a running state of the magnetic tape, said switching unit a pause actuating member for engaging said reel lock member with said takeup side reel block gear portion to switch to a running pause state of the magnetic tape when said pause actuating member is thrust from an initial state thereof, a fast feed actuating member and a rewind actuating member, wherein said reel lock member includes an abutting portion for compressing against said fast feed actuating member and/or said rewind actuating member thrust from an initial position thereof, said reel lock member being regulated in its movement by abutment of said fast feed actuating member and/or said rewind actuating member thrust from the initial position thereof against said abutting portion.

32. A recording/reproducing apparatus for a magnetic tape placed on a pair of tape reels, comprising:

a supply side reel block engaged with a supply side one of the pair of tape reels, said supply side reel block rotationally driving the supply side reel and having a supply side reel block gear portion;

a takeup side reel block engaged with a takeup side one of the pair of tape reels, said takeup side reel block rotationally driving the takeup side reel and having a takeup side reel block gear portion;

a capstan arbor for running the magnetic tape;

a driving unit meshing with said supply side reel block gear portion and said takeup side reel block gear portion for selectively rotationally driving said supply side reel block gear portion and said takeup side reel block gear portion;

a switching unit for switching a running state of the magnetic tape, said switching unit having at least one actuating member, said switching unit switching the running state of the magnetic tape by said actuating member being thrust from an initial position thereof;

a bearing unit for rotatably supporting said capstan arbor, said bearing unit having a first bearing portion of a metallic material and a second bearing portion of a resin material for supporting said first bearing portion;

a chassis for carrying said second bearing portion; and an electrically conductive resilient member having one end abutted against said first bearing portion and the other end abutted against said chassis.

33. The recording/reproducing apparatus for a magnetic tape as claimed in claim 32 further comprising:

a member moved by said actuating member under a bias of said resilient member.

34. The recording/reproducing apparatus for a magnetic tape as claimed in claim 2 further comprising:

a first biasing member for shifting said playback gear along the axis of rotation of the playback gear when said playback actuating member is reset to the initial position thereof and a second biasing member for shifting said fast feed gear along the axis of rotation of said fast feed gear when said fast feed actuating member is reset to the initial position thereof.

* * * * *